United States Patent
Thomsen et al.

(10) Patent No.: US 12,350,838 B2
(45) Date of Patent: Jul. 8, 2025

(54) INPUT SHAPING CONTROL OF A ROBOT ARM IN DIFFERENT REFERENCE SPACES

(71) Applicant: Universal Robots A/S, Odense S. (DK)

(72) Inventors: Dan Kielsholm Thomsen, Hinnerup (DK); Rune Søe-Knudsen, Årslev (DK); Jeppe Barsøe Jessen, Odense S (DK); Christian Valdemar Lorenzen, Odense S (DK)

(73) Assignee: Universal Robots A/S, Odense S (DK)

( * ) Notice: Subject to any disclaimer, the term of this patent is extended or adjusted under 35 U.S.C. 154(b) by 126 days.

(21) Appl. No.: 17/924,715

(22) PCT Filed: May 14, 2021

(86) PCT No.: PCT/DK2021/050155
§ 371 (c)(1),
(2) Date: Nov. 11, 2022

(87) PCT Pub. No.: WO2021/228347
PCT Pub. Date: Nov. 18, 2021

(65) Prior Publication Data
US 2023/0191603 A1    Jun. 22, 2023

(30) Foreign Application Priority Data
May 14, 2020    (DK) .......................... PA 2020 70318

(51) Int. Cl.
*B25J 9/16*    (2006.01)
*B25J 9/00*    (2006.01)

(52) U.S. Cl.
CPC ........... *B25J 9/1664* (2013.01); *B25J 9/0009* (2013.01)

(58) Field of Classification Search
CPC ...... B25J 9/1664; B25J 9/0009; B25J 9/1635; B25J 9/1641; B25J 9/1628; B25J 9/163;
(Continued)

(56) References Cited

U.S. PATENT DOCUMENTS

| | | | | |
|---|---|---|---|---|
| 5,638,267 A | * | 6/1997 | Singhose | ................. G05B 5/01 700/28 |
| 5,917,300 A | | 6/1999 | Tanquary et al. | |

(Continued)

FOREIGN PATENT DOCUMENTS

| | | |
|---|---|---|
| CN | 104589304 A | 5/2015 |
| CN | 109664297 A | 4/2019 |

(Continued)

OTHER PUBLICATIONS

Liu et al, "Vibration Suppression for Wafer Transfer Robot During Trajectory Tracking", 2010, (Year: 2010).*

(Continued)

*Primary Examiner* — Abby Y Lin
*Assistant Examiner* — Esvinder Singh
(74) *Attorney, Agent, or Firm* — ArentFox Schiff LLP

(57) ABSTRACT

A robot controller for controlling a robot arm includes a first space shaping module configured to provide a shaped first space target motion by convolving a first space target motion with an impulse train, where the first space target motion defines a target motion in a first reference space; a second space shaping module configured to provide a shaped second space target motion by convolving a second target motion with the impulse train; where the second target motion defines the target motion in a second reference space; and a motor controller module to generate motor control signals to the joint motors based on the shaped first space target motion and the shaped second space target motion.

26 Claims, 11 Drawing Sheets

(58) Field of Classification Search
CPC ...... B25J 9/1651; B25J 9/1653; B25J 9/1656; B25J 9/1674; G05B 2219/39195; G05B 2219/41217; G05B 2219/41231; G05B 2219/37434; G05B 2219/37435; G05B 2219/37517; G05B 2219/41229; G05B 2219/49048; G05B 2219/49054

See application file for complete search history.

(56) References Cited

U.S. PATENT DOCUMENTS

| | | |
|---|---|---|
| 5,988,411 A | 11/1999 | Singer et al. |
| 6,163,116 A | 12/2000 | Tanquary et al. |
| 6,314,473 B1 | 11/2001 | Singer et al. |
| 6,560,658 B2 | 5/2003 | Singer et al. |
| 6,829,207 B1 | 12/2004 | Singer et al. |
| 7,330,414 B2 | 2/2008 | Singer et al. |
| 7,433,144 B2 | 10/2008 | Singer et al. |
| 7,483,232 B2 | 1/2009 | Singer et al. |
| 7,620,739 B2 | 11/2009 | Singer et al. |
| 7,791,758 B2 | 9/2010 | Singer et al. |
| 8,144,417 B2 | 3/2012 | Singer et al. |
| 10,399,232 B2 | 9/2019 | Oestergaard et al. |
| 10,850,393 B2 | 12/2020 | Oestergaard et al. |
| 11,260,543 B2 | 3/2022 | Johansen |
| 11,474,510 B2 | 10/2022 | Oestergaard et al. |
| 11,796,045 B2 | 10/2023 | Johansen |
| 11,839,979 B2 | 12/2023 | Rosenlund et al. |
| 11,964,389 B2 | 4/2024 | Johansen |
| 12,011,824 B2 | 6/2024 | Vraa et al. |
| 2009/0154001 A1 | 6/2009 | Singer et al. |
| 2010/0309490 A1 | 12/2010 | Singer et al. |
| 2012/0176875 A1 | 7/2012 | Singer et al. |
| 2013/0079928 A1 | 3/2013 | Østergaard et al. |
| 2013/0231778 A1 | 9/2013 | Østergaard |
| 2013/0255426 A1 | 10/2013 | Kassow et al. |
| 2016/0318183 A1* | 11/2016 | Motoyoshi ............. B25J 9/1694 |
| 2020/0171658 A1 | 6/2020 | Kielsholm Thomsen |
| 2020/0261169 A1* | 8/2020 | Miller .................... B25J 9/1607 |
| 2021/0086374 A1 | 3/2021 | Brandt et al. |
| 2022/0161433 A1 | 5/2022 | Brandt et al. |
| 2022/0175472 A1* | 6/2022 | Brisson .................... B25J 9/163 |
| 2022/0184810 A1 | 6/2022 | Brandt et al. |
| 2022/0226993 A1 | 7/2022 | Madsen |
| 2022/0379463 A1 | 12/2022 | Hansen |
| 2022/0379468 A1 | 12/2022 | Hansen |
| 2022/0388156 A1 | 12/2022 | Hansen |
| 2023/0035296 A1 | 2/2023 | Søe-Knudsen et al. |
| 2023/0052996 A1 | 2/2023 | Thomsen |
| 2023/0098877 A1* | 3/2023 | Plante .................... F16H 47/00 74/89.13 |
| 2023/0405819 A1 | 12/2023 | Kravchenko et al. |
| 2023/0405822 A1 | 12/2023 | Kravchenko et al. |
| 2023/0418258 A1 | 12/2023 | Mirth |
| 2024/0351209 A1 | 10/2024 | Graabaek et al. |

FOREIGN PATENT DOCUMENTS

| | | |
|---|---|---|
| CN | 110026987 A | 7/2019 |
| WO | 2019/012040 A1 | 1/2019 |
| WO | 2019/094794 A2 | 5/2019 |
| WO | 2021228347 A1 | 11/2021 |

OTHER PUBLICATIONS

Zhao et al, "Zero Time Delay Input Shaping for Smooth Settling of Industrial Robots" 2016 (Year: 2016).*

Chang et al., "Time-varying input shaping technique applied to vibration reduction of an industrial robot," Control Engineering Practice vol. 13, Issue 1, pp. 121-130, DOI:10.1016/j.conengprac.2004.02.009 (Jan. 2005), 10 pages.

Chatlatanagulchai et al., "Command shaping applied to a flexible robot with configuration-dependent resonance," In 2006 American Control Conference, DOI:10.1109/ACC.2006.1656475 (Jun. 2006), 6 pages.

Freese et al., "Endpoint Vibration Control of a Mobile Mine-Detecting Robotic Manipulator," American Control Conference, ACC'07, IEEE, Piscataway, NJ, USA, pp. 7-12, (Jul. 1, 2007), 6 pages.

Kim et al., "Preshaping input trajectories of industrial robots for vibration suppression," Robotics and Computer Integrated Manufacturing, 54: 35-44, DOI:10.1016/j.rcim.2018.05.009 (2018), 20 pages.

Kivila, A., "Modeling, estimation and control for serial flexible robot arms," PHD thesis, Georgia Institute of Technology, URL: http://hdl .handle.net/ 1853/58644 (2017), 236 pages.

Liu et al., "Vibration Suppression for a Class of Flexible Manipulator Control with Input Shaping Technique," 2006 International Conference on Machine Learning and Cybernetics, IEEE, Piscataway, NJ, USA, pp. 835-839, (Aug. 13, 2006), 5 pages.

Liu et al., "Vibration suppression for wafer transfer robot during trajectory tracking," 2010 IEEE International Conference on Mechatronics and Automation, pp. 741-746, DOI:10.1109/ICMA.2010.5589042 (2010), 6 pages.

Qiang et al., "Residual vibration suppression using off-line learning input shaping method for a flexible joint robot," Intelligent Control and Automation (WCICA), 2012 10th World Congress on, pp. 3858-3863, (Jul. 2012); DOI:10.1109/WCICA.2012.6359116, 6 pages.

Solatges et al., "Adaptive input 5 shaper design for flexible robot manipulators," In 2017 IEEE/RSJ International Conference on Intelligent Robots and Systems (IROS), pp. 444-449, DOI:10.1109/IROS.2017.8202191 (2017), 6 pages.

Thomsen et al., "Experimental implementation of time-varying input shaping on UR robots," in: Proceedings of the 16th International Conference on Informatics in Control, Automation and Robotics (ICINCO 2019), vol. 1, pp. 488-498; DOI:10.5220/0007834504880498, (2019), 11 pages.

Thomsen et al., "Smooth online time-varying input shaping with fractional delay FIR filtering," Control Engineering Practice 88:21-37, DOI: 10.1016/j.conengprac.2019.04.003, (2019), 17 pages.

Zhao et al., "Zero time delay input shaping for smooth settling of industrial robots," 2016 IEEE International Conference on Automation Science and Engineering (CASE), pp. 620-625, DOI:10.1109/COASE.2016.7743459, (Aug. 2016), 6 pages.

International Search Report and Written Opinion in Application No. PCT/DK2021/050155, dated Sep. 3, 2021, 12 pages.

International Preliminary Report on Patentability in Application No. PCT/DK2021/050155 dated Nov. 15, 2022, 9 pages.

Office Action received for European Patent Application No. 21733054.7, Mailed on Sep. 16, 2024, 5 Pages.

Rupert Levi et al: "Comparing Model Predictive Control and input shaping for improved response of low-impedance robots", 2015 IEEE—RAS 15th International Conference on Humanoid Robots (Humanoids), IEEE, Nov. 3, 2015 (Nov. 3, 2015), pp. 256-263.

Chatlatanagulchai et al., "Switching ZVDk input shaper for flexible closed-loop system with saturation", In 2017 American Control Conference (ACC), 2017, pp. 4492-4497.

File History received for European Patent Application No. 21733054.7, downloaded on Dec. 12, 2024, 252 pages.

Ramli et al., "Control strategies for crane systems: A comprehensive review", In: Mechanical Systems and Signal Processing, Elsevier, Amsterdam, NL, vol. 95, 2017, pp. 1-23.

Search Report and Search Opinion received for European Application No. PA202070318, mailed on Nov. 30, 2020, 9 pages.

Universal Robots., "User Manual UR3/CB3", Version 3.1, 2009, 181 pages.

Office Action received for Chinese Patent Application No. 202180035014.5, mailed on Mar. 6, 2025, (9 pages), with English machine translation (10 pages).

Xiaofei, Zheng, "Stable and Precise Trajectory Control Technology for Wafer Transfer Robot", Dissertation for the Master Degree in engineering, Jun. 2009, 65 pages (English Abstract Included), with English machine translation (101 pages).

* cited by examiner

12,350,838 B2

INPUT SHAPING CONTROL OF A ROBOT ARM IN DIFFERENT REFERENCE SPACES

This application is a U.S. national stage entry of PCT application no. PCT/DK2021/050155 which was filed on May 14, 2021. PCT application no. PCT/DK2021/050155 claims priority to Denmark application no. PA202070318 which was filed on May 14, 2020. This application claims priority to both PCT application no. PCT/DK2021/050155 and to Denmark application no. PA202070318. Both PCT application no. PCT/DK2021/050155 and Denmark application no. PA202070318 are incorporated into this this application by reference.

FIELD OF THE INVENTION

The present invention relates to control of a robot arm, where vibrations of the robot arm are suppressed by utilizing input shaping. The robot arm comprises a plurality of robot joints connecting a robot base and a robot tool flange and a part of the robot arm (e.g. the tool flange) is controlled with reference to a cartesian space.

BACKGROUND OF THE INVENTION

Robot arms comprising a plurality of robot joints and links where motors or actuators can move parts of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques and/or forces the joint motors or actuators shall provide in order to move the robot joints for instance at specified velocity, acceleration or in order to hold the robot arm in a static posture.

Robot arms need to be programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start at a given instruction. The triggering signals can be provided by various indicators, such as safety curtains, vision systems, position indicators, etc.

Typically, it is possible to attach various end effectors to the robot tool flange or other parts of the robot arm, such as grippers, vacuum grippers, magnetic grippers, screwing machines, welding equipment, dispensing systems, visual systems etc.

A collaborative robot is a robot designed for direct interaction with a human. Light-weight design is one of the main concerns, when a robot is designed to be collaborative. This is to reduce the impact in a potential collision with a human or an obstacle. Thus the design will be a compromise between low mass and high rigidity. Light-weight design is a major goal in current development of robots, cranes, and automotive industry, just to name a few. A light-weight design is motivated by for example increased performance, increased safety, reduced environmental footprint, reduced energy consumption, and reduced price. A light-weight design will feature an increased amount of mechanical flexibility, compared to the traditional heavy and rigid industrial robots, which are often based on a cast iron design.

A robot arm motion can move its end-effector from one position two another in infinitely many ways. The most common motions are described in either joint space or Cartesian space. In robot arms with rotational robot joints the joint space motion is most natural for the robot actuators and is the fastest motion. The end-effector motion will in joint space motions follow a curved profile. The linear Cartesian motion leads to a linear end-effector motion, and a corresponding joint space motion, which can include high accelerations in different joint directions.

Robots with mechanical flexibility pose a challenge in terms of performance. For example, when rapid point-to-point motions are desired, and mechanical vibrations are not acceptable. Therefore, it is desired to suppress mechanical vibrations in robot arms. This can for instance be achieved by utilizing input shaping methods, which slightly modify the target motion of the robot arm, by intelligently adding a time-delay. The modified(shaped) trajectory will reduce the amount of vibrations at the critical natural frequencies of the system.

Input shaping for industrial robots has been implemented in both joint space and Cartesian space. Most implementations are in joint space, which is the natural control space of the robot, e.g. {iii.}-{iv.}-{v.}-{vi.}{vii.} Multiple researchers noticed Cartesian trajectory deviations related to joint space input shaping. Cartesian space input shaping for robots has been suggested and compared to joint space input shaping in order to reduce the path deviation {viii.} {ix.}{x.}.

WO19012040A1 and corresponding scientific articles {i.} {ii.} disclose a method for generating inputs to a physical system with varying dynamic properties, which can be used to suppress the mechanical vibrations of a robot arm. The control signals to the robot arm are generated based on the dynamic properties of the physical system which for instance can be obtained based on dynamic modeling of the physical system, lookup tables containing dynamic properties of the physical system, measurements of parts of the physical system, or a combination of the aforementioned. WO19012040A1, {i.} and {ii.} utilizes a Time-Varying input Shaping method in joint space. Time-Varying Input Shaping has never been presented in Cartesian space. The existing research on Cartesian input shaping for robot arms relies on a trajectory generator, which outputs Cartesian reference position instead of joint angles.

Vibration suppression can be effective in either filtering space. However, a joint space filter will cause deviations of a Cartesian path. Likewise, a Cartesian filter on a joint space motion undermines the benefits of linear joint space motions, such as short duration without exceeding actuator limits. In general, joint space motions will benefit from joint space filtering, and Cartesian motions will benefit from Cartesian space filtering.

It is possible to switch between the two methods when the robot is at a standstill. However, programming of robots, such as the UR robots UR3, UR5, UR10, UR3e, UR5e, UR10e and UR16e provided by Universal Robots A/S, allow a so-called blend between joint space motions and Cartesian space motions. A blend is a soft transition between the trajectories, which eliminates the need for a standstill and increase productivity. Utilizing input shaping either joint space or Cartesian space during blend between joint space motions and causes space motion causes significant deviations from the intended path of motion of the robot arm.

REFERENCES

{i.} D. K. Thomsen, R. Soe-Knudsen, D. Brandt, X. Zhang, Experimental implementation of time-varying input shaping on ur robots, in: Proceedings of the 16th International Conference on Informatics in Control, Automation and Robotics (ICINCO 2019), Vol. 1, 2019, pp. 488-498; doi:10.5220/0007834504880498

{ii.} D. K. Thomsen, R. Soe-Knudsen, D. Brandt, O. Balling, X. Zhang, Smooth online time-varying input shaping with fractional delay {FIR} filtering, Control Engineering Practice 88 (2019) 21-37; doi:10.1016/j.conengprac.2019.04.003

{iii.} P. H. Chang, H.-S. Park, Time-varying input shaping technique applied to vibration reduction of an industrial robot, Control Engineering Practice Volume 13, Issue 1, January 2005, pages 121-130; doi:10.1016/j.conengprac.2004.02.009

{iv.} W. Chatlatanagulchai, V. M. Beazel, and P. H. Meckl. Command shaping applied to a flexible robot with configuration-dependent resonance. In 2006 American Control Conference, June 2006; doi:10.1109/ACC.2006.1656475

{v.} Y. Qiang, F. Jing, Z. Hou, and P. Jia. Residual vibration suppression using off-line learning input shaping method for a flexible joint robot. In Intelligent Control and Automation (WCICA), 2012 10th World Congress on, pages 3858-3863, July 2012; doi:10.1109/WCICA.2012.6359116.

{vi.} Arto Kivila. Modeling, estimation and control for serial flexible robot arms. PhD thesis, Georgia Institute of Technology, 2017; URL: http://hdl.handle.net/1853/58644

{vii.} T. Solatges, S. Rubrecht, M. Rognant, and P. Bidaud. Adaptive input shaper design for flexible robot manipulators. In 2017 IEEE/RSJ International Conference on Intelligent Robots and Systems (IROS), pages 444-449, September 2017. doi:10.1109/IROS.2017.8202191

{viii.} Y. Liu, Y. Cao, L. Sun, and X. Zheng. Vibration suppression for wafer transfer robot during trajectory tracking. In 2010 IEEE International Conference on Mechatronics and Automation, pages 741-746, 2010. doi:10.1109/ICMA.2010.5589042

{ix.} Yu Zhao, W. Chen, Te Tang, and M. Tomizuka. Zero time delay input shaping for smooth settling of industrial robots. In 2016 IEEE International Conference on Automation Science and Engineering (CASE), pages 620-625, August 2016. doi:10.1109/COASE.2016.7743459

{x.} Joonyoung Kim and Elizabeth A. Croft. Preshaping input trajectories of industrial robots for vibration suppression. Robotics and Computer-Integrated Manufacturing, 54: 35-44, 2018 doi:10.1016/j.rcim.2018.05.009.

SUMMARY OF THE INVENTION

The objective of the present invention is to address the above described limitations with the prior art or other problems of the prior art. This is achieved by a robot controller for controlling a robot arm where the robot controller comprises:

a first space shaping module configured to provide a shaped first space target motion by convolving a first space target motion with an impulse train, where the first space target motion defines a target motion in a first reference space;

a second space shaping module configured to provide a shaped second space target motion by convolving a second space target motion with the impulse train; where the second target motion defines the target motion in a second reference space; and a motor controller module is configured to generate motor control signals to the joint motors based on at least one of the shaped first space target motion and the shaped second space target motion.

Further, the objective of the present invention is addressed by a method of controlling a robot arm where the method comprises the steps of:

generating a shaped first space target motion by convolving a first space target motion with an impulse train; where the first space target motion defines a target motion in a first reference space;

generating a shaped second space target motion by convolving a second space target motion with the impulse train; where the second space target motion defines the target motion in a second reference space; and generating motor control signals for the joint motors of the robot arm based on at least one of the shaped first space target motion and the shaped second space target motion.

The robot controller and method according to the present invention makes it possible to dynamically adjust in which reference space the input shaping shall be performed whereby deviations in position in another reference space can be reduced. Further it is possible to dynamically provide input shaping in two different reference spaces and gradually change from one reference space to another reference space. For instance this makes it possible to preserve the core feature of blending between joint space motions and cartesian space motions, as a new implementation strategy for Cartesian Input Shaping is presented. The proposed implementation enables the filtering space to be changed during motion, and is further extended, such that filtering can be completely enabled or disabled during motion, which is also a new feature within input shaping. Further advantages and benefits are described in the detailed description of the invention.

The dependent claims describe possible embodiments of the method according to the present invention. The advantages and benefits of the present invention are described in the detailed description of the invention

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have been given the same last two digits. Further it is to be understood that in the case that an embodiment comprises a plurality of the same features then only some of the features may be labeled by a reference number.

Figure 1:
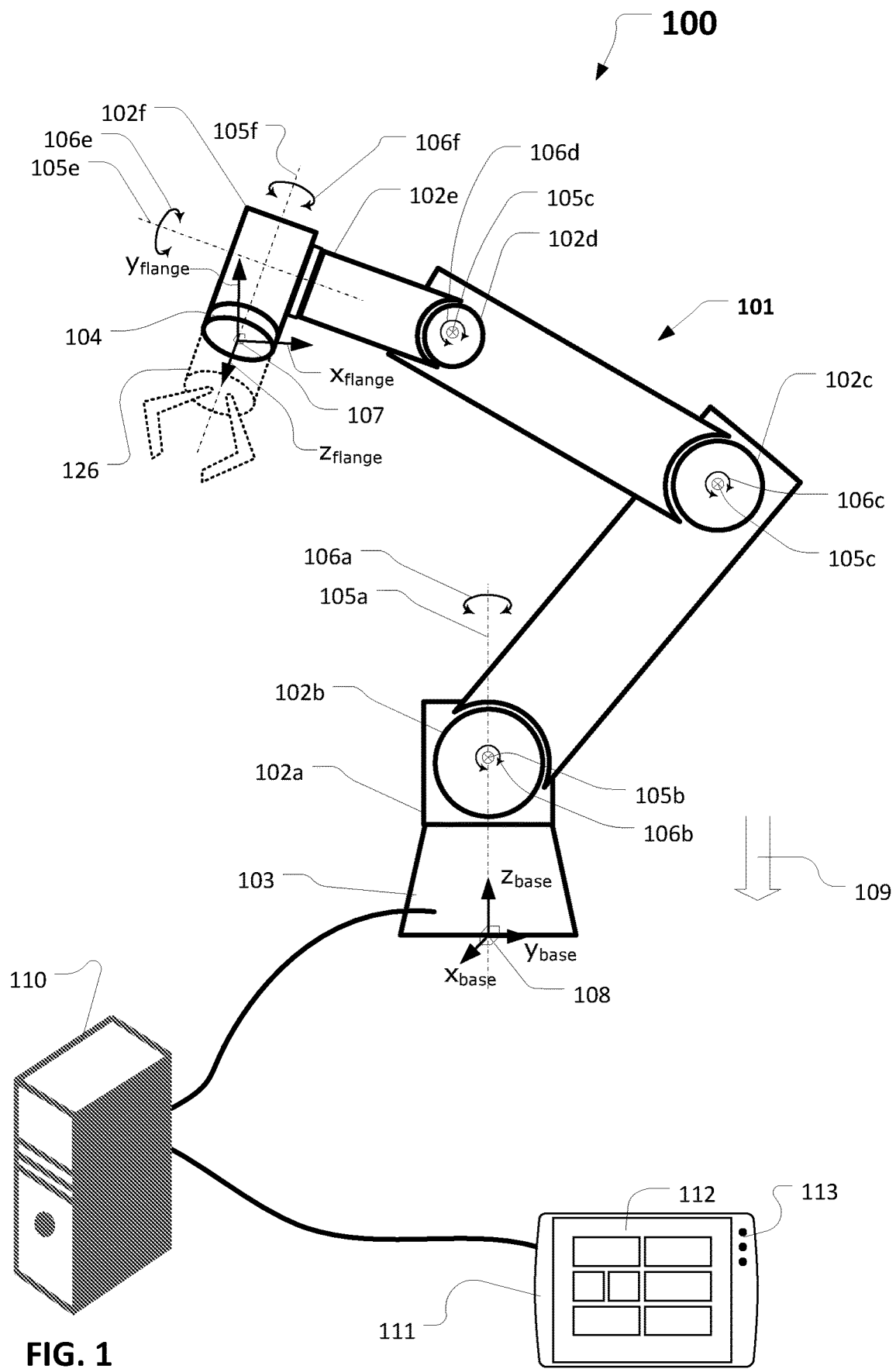
FIG. 1 illustrates a robot arm configured according to the present invention.

FIG. 1 illustrates a robot system 100 according to the present invention, where the robot system comprises at least one robot arm 101 and at least one robot controller 110 configured to control the robot arm.

The robot arm 101 comprises a plurality of robot joints 102a, 102b, 102c, 102d, 102e, 102f connecting a robot base 103 and a robot tool flange 104. A base joint 102a is configured to rotate the robot arm around a base axis 105a (illustrated by a dashed dotted line) as illustrated by rotation arrow 106a; a shoulder joint 102b is configured to rotate the robot arm around a shoulder axis 105b (illustrated by a cross indicating the axis) as illustrated by rotation arrow 106b; an elbow joint 102c is configured to rotate the robot arm around an elbow axis 105c (illustrated by a cross indicating the axis) as illustrated by rotation arrow 106c; a first wrist joint 102d is configured to rotate the robot arm around a first wrist axis 105d (illustrated by a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a robot tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

The robot joints may comprise a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joints can comprise at least one joint sensor providing a sensor signal for instance indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint. The joint sensor can also be provided as a force-torque sensor or an acceleration sensor. For instance, a force and/or torque sensor may be provided at the tool joint and configured to indicate force and/or torque provided to the tool flange and an acceleration sensor may also be provided at the tool joint and configured to indicate the acceleration of the tool joint. However, the other parts of the robot arm may also comprise force-torque sensors or acceleration sensors.

A robot tool flange reference point 107 also known as a TCP (Tool Center Point) is indicated at the robot tool flange and defines the origin of a tool flange coordinate system defining three coordinate axes $x_{flange}$, $y_{flange}$, $z_{flange}$. In the illustrated embodiment the origin of the robot tool flange coordinate system has been arrange on the tool flange axis 105f with one axis ($z_{flange}$) parallel with the tool flange axis and with the other axes $x_{flange}$, $y_{flange}$ parallel with the outer surface of the robot tool flange 104. Further a base reference point 108 is coincident with the origin of a robot base coordinate system defining three coordinate axes $x_{base}$, $y_{base}$, $z_{base}$. In the illustrated embodiment the origin of the robot base coordinate system has been arrange on the base axis 105a with one axis ($z_{base}$) parallel with the base axis 105a axis and with the other axes $x_{base}$, $y_{base}$ parallel with at the bottom surface of the robot base. The direction of gravity 109 in relation to the robot arm is also indicated by an arrow and it is to be understood that the robot arm can be arrange at any position and orientation in relation to gravity.

The robot system comprises at least one robot controller 110 configured to control the robot arm 101. The robot controller is configured to control the motions of the parts of the robot arm and the robot joints for instance by controlling the motor torque provided to the joint motors based on a dynamic model of the robot arm, the direction of gravity acting and the joint sensor signal. Further the robot controller may control the motions of the robot arm based on a robot program stored in a memory of the robot controller. The controller can be provided as an external device as illustrated in FIG. 1 or as a device integrated into the robot arm or as a combination thereof.

The robot controller can comprise an interface device 111 enabling a user to control and program the robot arm. The interface device can for instance be provided as a teach pendent as known from the field of industrial robots which can communicate with the controller via wired or wireless communication protocols. The interface device can for instanced comprise a display 112 and a number of input devices 113 such as buttons, sliders, touchpads, joysticks, track balls, gesture recognition devices, keyboards, microphones etc. The display may be provided as a touch screen acting both as display and input device. The interface device can also be provided as an external device configured to communicate with the robot controller, for instance in form of smart phones, tablets, PCs, laptops etc.

The robot system may also comprise an end effector 126 (illustrated in dotted lines) attached to the robot tool flange and is illustrated in form of a gripper, however it is to be understood that the end effector can be any kind of end effector such as grippers, vacuum grippers, magnetic grippers, screwing machines, welding equipment, gluing equipment, dispensing systems, painting equipment, visual systems, cameras etc.

Figure 2:
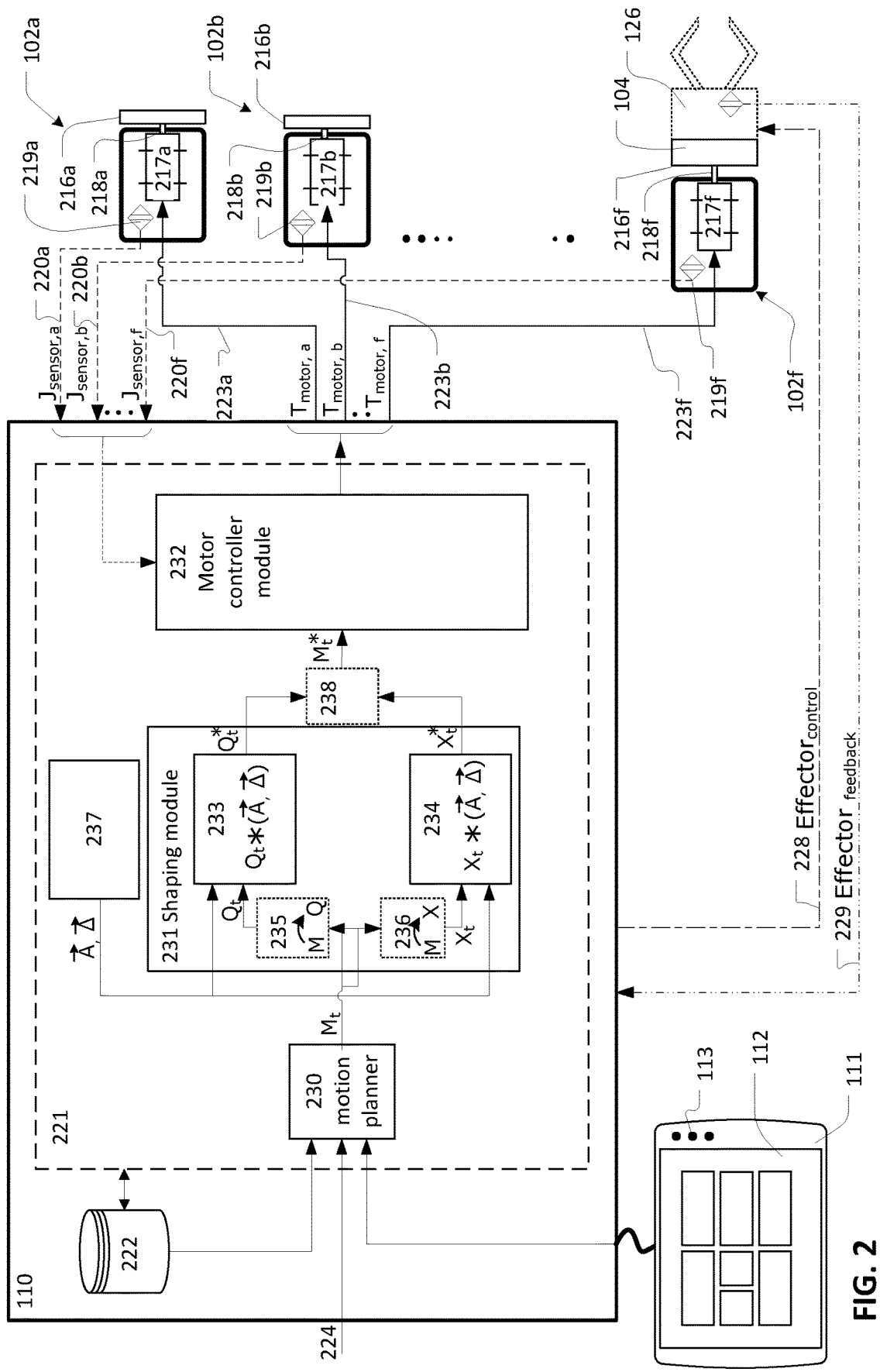
FIG. 2 illustrates a simplified structural diagram of the robot arm of FIG. 1.

FIG. 2 illustrates a simplified structural diagram of the robot arm illustrated in FIG. 1. The robot joints 102a, 102b and 102f have been illustrated in structural form and the robot joints 102c, 102d, 102e and the robot links connecting the robot joints have been omitted for the sake of simplicity of the drawing. Further the robot joints are illustrated as separate elements however it is to be understood that they are interconnected either directly or via a robot link as illustrated in FIG. 1. The robot joints comprise an output flange 216a, 216b, 216f and a joint motor 217a, 217b, 217f or another kind of actuator, where the output flange 216a, 216b, 216f is rotatable in relation to the robot joint body. The joint motors 217a, 217b, 217f are respectively configured to rotate the output flanges 216a, 216b, 216f via an output axle 218a, 218b, 218f. It is to be understood that the joint motor or joint actuator may be configured to rotate the output flange via a transmission system such as a gear (not shown). In this embodiment the output flange 216f of the tool joint 102f constitutes the tool flange 104. The robot joints may optionally comprise at least one joint sensor 219a, 219b, 219f providing a sensor signal 220a, 220b, 220f indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. The joint sensor parameter can for instance be selected from the list comprising: speed, acceleration, torque, motor torque, force and position. The joint sensor parameters can be measures obtained from sensors or values derived from such sensor values. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. The motor currents can be obtained and indicated by current sensors. The motor torque can for instance be obtained based on motor currents or via torque sensors provided in the robot joints.

The end effector 126 connected to the robot tool flange 104 may be connected to the robot controller and the robot controller may be configured to control the end effector via an end effector control signal 228. Further the end effector may provide an effector feedback signal 229 to the robot controller for instance in order to indicate the status of the end effector, status of various end effector sensors etc.

The robot controller 110 comprises a processer 221, memory 222 and communication interfaces for communicating with external devices such as the user interface, the robot joints, the end effector etc. The processor comprises a motion planner module 230, a shaping module 231, an impulse generation module 237, a combining module 238 and a motor controller module 232. The motion planner module 230, the shaping module 231, the impulse generation module 237, the combining module 238 and the motor controller module 232 can for instance be provided as processes executed by the processor 221, however it is noted that they also can be provided and executed on separate processor units.

The motion planner module 230 is configured to provide target motions of the robot arm, for instance by generating trajectories of parts of the robot arm. The trajectories can for instance be generated based on a robot program stored in a memory 222, based on an external control signal 224 and/or user inputs provided via an interface device 111. In the illustrated embodiment the motion planner module provides a target motion $M_t$ of parts of the robot arm. The target motion may indicate the kinematics of at least at part of the robot arm, for instance a path along which a part of the robot arm shall move, the speed of a part of the robot arm, the acceleration of a part of the robot arm, a waypoint to which a part of the robot arm shall move, or a force/torque to be generated by part of the robot arm. The target motion can for instance be indicated in a target reference space, such as a cartesian space in reference to the robot base coordinate system, the tool flange coordinate system or any other reference coordinate systems, such as a polar coordinate system. Also, the target motion can be indicated in joint space where the kinematics of the robot joints are indicated; e.g. as angular position $q_t$ of output axles of the joint transmissions, a desired angular velocity $\dot{q}_t$ of output axles of the joint transmissions, a desired angular acceleration $\ddot{q}_t$ of the robot transmission.

The shaping module 231 is configured to provide at least one shaped target motion based on the target motion $M_t$ and the impulse train A, S, in order to utilize input shaping reducing the vibrations of the robot arm. The impulse train comprises a number of impulses $\vec{A}$ separated by a time distance $\vec{\Delta}$. In the illustrated embodiment the impulse train is generated by the impulse generation module 237 which is configured to generate the impulse train based on the vibrational properties of the robot arm as known in the art of input shaping, for instance based on the configuration/pose of the robot arm. For instance, the configuration/pose of the robot arm can be obtained based on the target motion or the joint sensor parameters, such as the angular position of the output flanges of the robot joints. The impulse train can also be obtained from memory 222.

According to the present invention, the shaping module 231 comprises a first space shaping module 233 and a second space shaping module 234. The first space shaping module 233 is configured to provide a shaped first space target motion $Q_t^*$ by convolving a first space target motion $Q_t$ with the impulse train $(\vec{A}, \vec{\Delta})$, where the first space target motion $Q_t$ defines the target motion in a first reference space. The second space shaping module 234 is configured to provide a shaped second space target motion $X_t^*$ by convolving a second space target motion $X_t$ with the impulse train $(\vec{A}, \vec{\Delta})$, where the second space target motion defines the target motion in a second reference space.

The shaping module may optionally comprise a target space to first space transformation module 235 configured to transform the target motion $M_t$ into the first space target motion in the first reference space $Q_t$. This can be achieved by utilizing a mapping functions transforming the target motion into the first reference space, for instance the target motion $M_t$ may define the kinematics of a part of the robot in relation to a reference point in a coordinate space and the target space to first space transformation module 235 can be configured to utilize inverse kinematics as known from the field of robotics to transform the target motion into for instance a joint reference space, where the kinematics of at least a part of the robot arm is indicated based on robot joint parameters such as the kinematics of joint motors or the kinematics of the output flanges. It is to be understood that the target space to first space conversion module 235 may be omitted in embodiments where the first target motion $M_t$ indicates the target motion of the robot arm in the first reference space, as consequently the first space shaping module 233 can provide the shaped first space target motion by convolving the target motion $M_t$ with the impulse train.

The shaping module may optionally comprise a target space to second space transformation module 236 configured to transform the target motion $M_t$ into the second space target motion in the second reference space $X_t$. This can be achieved by utilizing a mapping functions transforming the target motion into the second reference space. For instance, the target motion $M_t$ may define the kinematics of a part of the robot arm in a joint reference space, where the kinematics of at least a part of the robot arm is indicated based on robot joint parameters such as the kinematics of joint motors or the kinematics of the output flanges, and the target space to second space transformation module 236 can be configured to utilize forward kinematics as known from the field of robotics to transform the target motion into for a coordinate space where the kinematics of the robot arm is indicated in relation to a reference point. It is to be understood that the target second space transformation module 236 may be omitted in embodiments where the second target motion $M_t$ indicates the target motion of the robot arm in the second reference space, as consequently the second space shaping module 234 can provide the shaped second space target motion by convolving the target motion $M_t$ with the impulse train.

The combining module 238 is configured to combine the shaped first space target motion $Q_t^*$ and the shaped second space target motion $X_t^*$ into a combined shaped target motion $M_t^*$, based on which the motor controller module generates the motor control signals. Consequently, the motor controller module can be provided as known in the art of robot control as the motor controller module receives a shaped target motion which is of the same kind as an ordinary target motion. The combination module can for instance be configured to transform the shaped first space target motion $Q_t^*$ and the shaped second space target motion $X_t^*$ into the reference space of the target motion $M_t$ and then adding the two shaped target motions. In one embodiment the two shaped target motions can be scaled in relation to each other.

The motor controller module 232 is configured to generate the at least one motor control signal 223a-223f to the joint motors based on at least one of the shaped first space target motion $Q_t^*$ and the shaped second space target $X_t^*$ which in the illustrated embodiment is provided as the combined shaped target motion $M_t^*$ provided by the combining module. The motor controller module 232 is configured to generate at least one motor control signal to the joint motors, for instance in form of motor control signals 223a, 223b, 223f indicating control parameters for the joint motors, which can be used to control the joint motors as desired. For instance the control parameters can indicate the motor torque $T_{motor,a}$, $T_{motor,b}$, and $T_{motor,f}$ that each joint motor shall provide to the output flanges and the robot controller is configured to determine the motor torque based on a dynamic model of the robot arm as known in the prior art. The motor controller module 232 is configured to generate the motor control signals 223a, 223b, 223f based on the combined shaped target motion $M_t^*$ and a dynamic model of the robot arm $D_{robot}$. The dynamic model of the robot arm $D_{robot}$ can for instance be stored in a memory 222. The dynamic model makes it possible for the controller to calculate which torque the joint motors shall provide to each of the joint motors to make the robot arm perform a target motion, where a target motion indicate a motion of at least a part of the robot arm. The motor controller module may additionally also as illustrated by dotted line be configured to generate the motor control signal 223a, 223b, 223f based on at least one sensor signal 220a, 220b, 220f indicative of at least one joint sensor parameter $J_{sensor,a}$, $J_{sensor,b}$, $J_{sensor,f}$ and/or other sensor signals indicating other robot parameters. The sensor signal can for instance indicate the angular position q of the output flange; the angular position θ of the motor axle; the motor torque $T_{motor}$ provided to the motor axle by the joint motor. For instance, the joint motors can be provided as multiphase electromotors and the robot controller can be configured to adjust the motor torque provided by the joint motors by regulating the current through the phases of the multiphase motors as known in the art of motor regulation.

Figure 9:
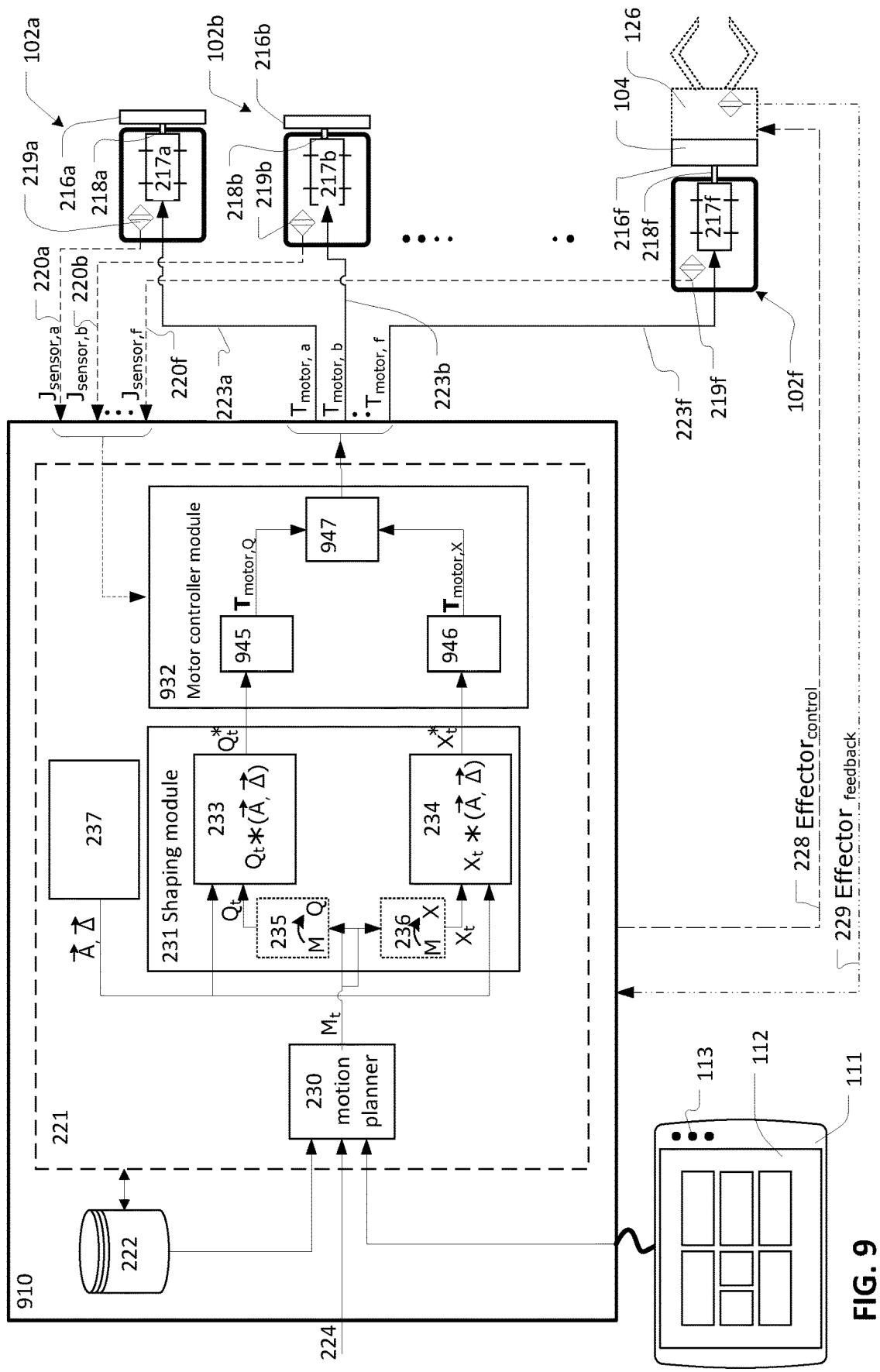
FIG. 9 illustrates a simplified structural diagram of an embodiment of a robot controller for a robot arm configured according to the present invention.

It is noted that the motor controller module 232 also can be configured to generate the at least one motor control signal 223a-223f to the joint motors directly based on at least one of the shaped first space target motion $Q_t^*$ and the shaped second space target $X_t^*$. The shaped first space target motion $Q_t^*$ and the shaped second space target $X_t^*$ can thus be directly provided to the motor controller module 232 and the combination module 238 can thus be omitted. Such an embodiment is illustrated in FIG. 9.

Providing both a shaped first space target motion $Q_t^*$ and a shaped second space target motion $X_t^*$ makes it possible to utilize impulse shaping in two different references spaces whereby impulse shaping in two different reference spaces can be utilized. Consequently, the user of the robot arm can choose in which reference space that he/she wants to reduce vibrations of the robot arm and also online switch between in which reference space the impulse shaping shall be implemented. This is beneficial during a target motion defining a continuous motion, where at least a part of the robot arm constantly moves; meaning that the part of the robot arm during the continues motion does not experience a standstill where the speed of the part is zero.

In one embodiment the robot controller is configured to generate the at least one motor control signal (223a-223f) based on the shaped first space target motion ($Q_t^*$) and the shaped second space target motion ($X_t^*$). This is useful in connection with parts of a continues motion where the target motion changes from moving in relation to a first reference space to moving in relation to a second reference space or in connection with blend parts of a continuous motion.

In one embodiment the robot controller is configured to:
  in a first part of the continuous motion to generate the motor control signals (223a-223f) based on the shaped first space target motion ($Q_t^*$) and not based on the shaped second space target motion ($X_t^*$); and
  in a second part of the target motion to generate the motor control signals (223a-223f) based on the shaped second space target motion ($X_t^*$) and not based on the shaped first space target motion ($Q_t^*$).

This is useful in connection with continues motions where the target motion has parts moving in relation to one reference space and other parts moving in relation to a second reference space.

Figure 3:
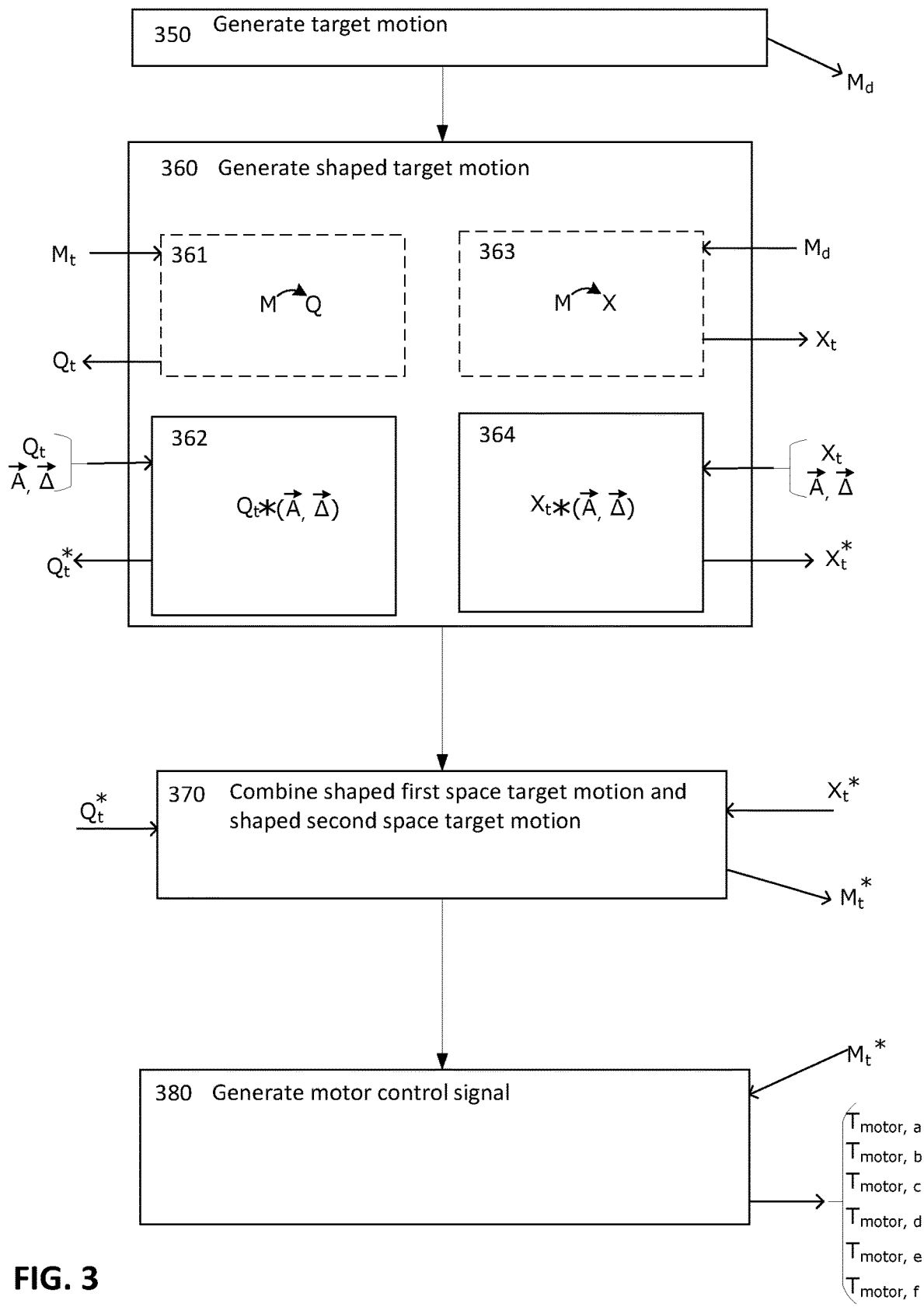
FIG. 3 illustrates a flow chart of a method of controlling a robot arm according to the present invention.

FIG. 3 illustrates a method of controlling a robot arm according to the present invention. The method comprises step 360 of generating shaped target motions, step 370 of combining shaped target motions and step 380 of generating at least one motor control signal. Step 360 of generating shaped target motions comprises a step 362 of generating a shaped first space target motion $Q_t^*$ and a step 364 of generating a shaped second space target motion $X_t^*$. Step 370 combines the shaped first space target motion $Q_t^*$ and the shaped second space target motion $X_t^*$ into a combined shaped target motion $M_t^*$ and step 360 generates at least one motor control signal $T_{motor,a}$-$T_{motor,f}$ for the robot arm motors based on the combined shaped target motion M. The robot arm can be similar to the robot arm illustrated and described in FIGS. 1 and 2.

In step 362 the shaped first space target motion $Q_t^*$ is generated by convolving a first space target motion $Q_t$ with an impulse train ($\vec{A}, \vec{\Delta}$); where the first space target motion defines the target motion in a first reference space. In case the original reference space of the target motion $M_t$ is the same as the first reference space then the target motion and the first space target motion is the same and the shaped first space target motion can be provided by convolving the target motion $M_t$ with the impulse train. In case the original reference space of the target motion is different from the first reference space then the method can comprise an optional step 361 of transforming the target motion into a first space target motion indicating the target motion in the first reference space and the shaped first space target motion can then be generated by convolving the transformed target motion with the impulse train. The impulse train comprises a number of impulses A separated by a time distance A' and is provided based on the vibrational properties of the robot arm as known in the art of input shaping, for instance based on the configuration/pose of the robot arm.

In step 364 the shaped second space target motion $X_t^*$ is generated by convolving a second space target motion with an impulse train ($\vec{A}, \vec{\Delta}$); where the second space target motion defines the target motion in a second reference space. In case the original reference space of the target motion $M_t$ is the same as the second reference space then the target motion and the second space target motion is the same and the shaped second space target motion can be provided by convolving the target motion $M_t$ with the impulse train. In case the original reference space of the target motion is different from the second reference space then the method can comprise a step 363 of transforming the target motion into a second space target motion $X_t$ indicating the target motion in the second reference space and the shaped second space target motion can be generated by convolving the transformed target motion with the impulse train.

In the illustrated embodiment the method comprises a step 370 of combining the shaped first space target motion $Q_t^*$ and the shaped second space target motion $X_t^*$ into a combined shaped target motion $M_t^*$. This can for instance be achieved by transforming the shaped first space target motion and the shaped second space target motion into a same reference space for instance the reference space of the target motion and then add the transformed shaped first space target motion and the transformed shaped second space target motion together.

Step 380 of generating at least one motor control signal (223a-223f) for the joint motors based on the combined shaped target motion can be performed as known in the art of robot motor control where a target motion is converted into motor control signals such as motor torques and/or motor currents and is performed based on a dynamic model of the robot arm. For instance, the motor control signal(s) may be generated based on the combined shaped target motion $M_t^*$ whereby the motor control signal(s) will be generated based on input shaping in two different reference spaces whereby input shaping in two different reference spaces can be utilized. Consequently, the user of the robot arm can control the robot arm by choosing in which reference space that he/she wants to reduce vibrations of the robot arm and also online switch between in which reference space the input shaping shall be implemented. This is beneficial during a target motion defining a continuous motion, where at least a part of the robot arm constantly moves; meaning that the part of the robot arm during the continues motion does not experience a standstill where the speed of the part is zero.

In one embodiment the method comprises a step of generating the at least one motor control signal (223a-223f) based on the shaped first space target motion ($Q_t^*$) and the shaped second space target motion ($X_t^*$). This is useful in connection with parts of a continues motion where the target motion changes from moving in relation to a first reference space to moving in relation to a second reference space or in connection with blend parts of a continuous motion.

In one embodiment the method comprises steps of:
  in a first part of the continuous motion generating the motor control signals (223a-223f) based on the shaped first space target motion ($Q_t^*$) and not based on the shaped second space target motion ($X_t^*$); and
  in a second part of the target motion to generating the motor control signals (223a-223f) based on the shaped second space target motion ($X_t^*$) and not based on the shaped first space target motion ($Q_t^*$).

This is useful in connection with continues motions where the target motion has parts moving in relation to one reference space and other parts moving in relation to a second reference space.

In an embodiment of the robot controller/method, the first reference space and the second reference space are different and can be any combination of two of:
- a joint reference space wherein the kinematics of at least a part of the robot arm are indicated based on robot joint parameters, where the robot joint parameters indicate the kinematics of at least one of the joint motors and the kinematics of the output flanges, whereby the first or second space target motion indicates the target motion in terms of robot joint parameters;
- a cartesian coordinate space wherein the kinematics of at least a part of the robot arm in relation to a reference point are indicated in terms of cartesian coordinates, whereby the first or second space target motion indicates the target motion in terms of cartesian coordinates;
- a polar coordinate space wherein the kinematics of at least a part of the robot arm in relation to a reference point are indicated in terms of polar coordinates, whereby the first or second space target motion indicates the target motion in terms of polar coordinates;
- a cylindrical coordinate system wherein the kinematics of at least a part of the robot arm in relation to a reference point are indicated in terms of cylindrical coordinates, whereby the first or second space target motion indicates the target motion in terms of cylindrical coordinates;
- a spherical coordinate system wherein the kinematics of at least a part of the robot arm in relation to a reference point are indicated in terms of spherical coordinates, whereby the first or second space target motion indicates the target motion in terms of spherical coordinates.

In an embodiment of the robot controller/method, the first reference space and the second reference space are different, and the first reference space is a joint reference space while the second reference space is a coordinate space. In the joint reference space, the kinematics of at least a part of the robot arm are indicated based on robot joint parameters, where the robot joint parameters indicate the kinematics of at least one of the joint motors and the kinematics of the output flanges, whereby the first space target motion indicates the target motion in terms of robot joint parameters. In the coordinate space, the kinematics of at least a part of the robot arm are indicated in relation to a reference point, whereby the second space target motion indicates the target motion in terms of coordinates of the coordinate space. The coordinate space may for instance be any one of:
- a cartesian coordinate space wherein the kinematics of at least a part of the robot arm in relation to the reference point are indicated in terms of cartesian coordinates, whereby the second space target motion indicates the target motion in terms of cartesian coordinates;
- a polar coordinate space wherein the kinematics of at least a part of the robot arm in relation to the reference point are indicated in terms of polar coordinates, whereby the second space target motion indicates the target motion in terms of polar coordinates;
- a cylindrical coordinate system wherein the kinematics of at least a part of the robot arm in relation to the reference point are indicated in terms of cylindrical coordinates, whereby the second space target motion indicates the target motion in terms of cylindrical coordinates;
- a spherical coordinate system wherein the kinematics of at least a part of the robot arm in relation to the reference point are indicated in terms of spherical coordinates, whereby the second space target motion indicates the target motion in terms of spherical coordinates In an embodiment of the robot controller/method, the first reference space and the second reference space are different in that:
- the first reference space is a coordinate reference space wherein the kinematics of at least a part of the robot arm are indicated in relation to a first reference point, and in that
- the second reference space is a coordinate reference space wherein the kinematics of at least a part of the robot arm are indicated in relation to a second reference point; and in that
- the first reference point and the second reference point are different.

The coordinate space may for instance be any one of the coordinate spaces listed in paragraph [0045]. This makes it possible to utilize input shaping in two reference spaces of the same kind having different reference points. For instance, in an embodiment where the robot arm is mounted on a moving support such as a vehicle. The first reference point can be defined as a fixed point on the moving support and the second reference point as a fixed point in relation to the moving support. Also, the first reference point can be defined as a fixed point defined in relation to a fixed part of the robot arm such as the robot base and the second reference point can be defined as a moving point defined in relation to a moving part of the robot arm such as the tool flange. This makes it possible for the user to choose in relation to which reference point the vibrations shall be reduced utilizing input shaping.

Figure 4:
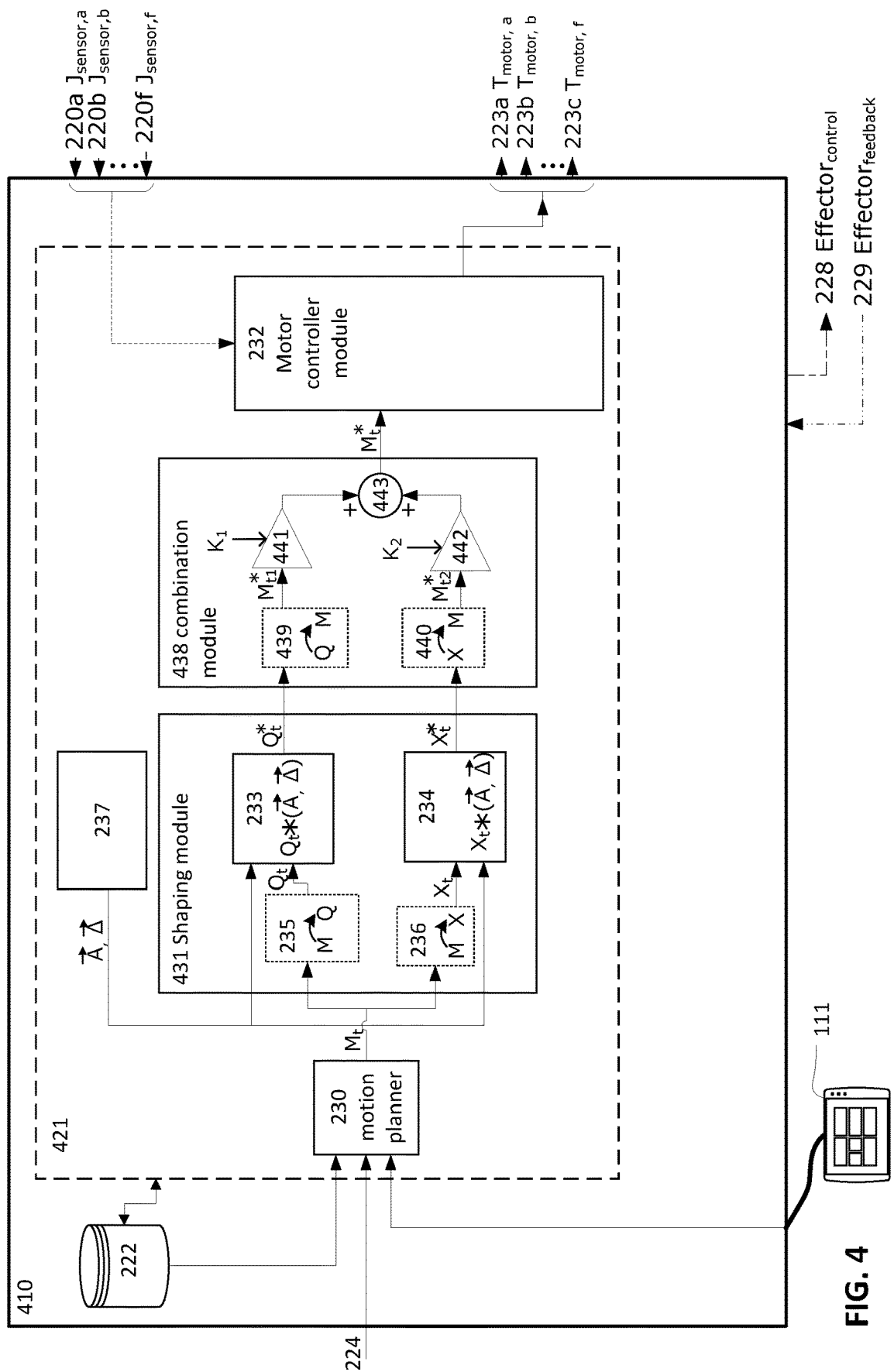
FIG. 4 illustrates a simplified structural diagram of an embodiment of a robot controller for a robot arm configured according to the present invention.

FIG. 4 illustrates a simplified structural diagram of a robot controller 410 for controlling a robot arm. The robot controller 410 is similar to the robot controller of the robot arm illustrated in FIGS. 1 and 2 and similar elements and features have been given the same reference numbers and will not be describe further. Further the robot joints and end effector illustrated in FIGS. 1 and 2 have been omitted for simplicity of the drawing. The robot controller comprises at least one space transformation module configured to transform the shaped first space target motion and/or the shaped second space target motion into a same reference space. Further, the robot controller comprises at least one scaling module configured to scale at least one of the shaped first space target motion according to a first space scaling parameter and the shaped second space target motion according to a second space scaling parameter.

In the illustrated embodiment a first space to target space transformation module 439 is configured to transform the shaped first space target motion $Q_t^*$ into the reference space of the target motion $M_t$ and thereby provide a shaped first space target motion in the target space $M_{t1}$. This can be achieved by utilizing a mapping functions transforming the shaped first space target motion $Q_t^*$ into the target reference space. For instance, if the target space defines the kinematics of a part of the robot arm in relation to a reference point in a coordinate space and the first reference space defines the kinematics of a part of the robot arm in a joint space, then the first space to target space transformation module 439 can be configured to utilize forward kinematics as known from the field of robotics to transform the shaped first space target motion $Q_t^*$ into a shaped first space target motion in the target space $M_{t1}$.

It is to be understood that the first space to target space transformation module 439 may be omitted in embodiments where the target motion $M_t$ indicates the target motion of the robot arm in the first reference space. Also, in embodiments where the target motion $M_t$ indicates the target motion of the robot arm in the second reference space then the first space to target space transformation module 439 can be configure to transform the shaped first space target motion $Q_t^*$ into the second reference space.

In the illustrated embodiment a second space to target space transformation module 440 is configured to transform the shaped second space target motion $X_t^*$ into the reference space of the target motion $M_t$ and thereby provide a shaped second space target motion in the target space $M_{t2}$. This can be achieved by utilizing a mapping functions transforming the shaped second space target motion $X_t^*$ into the target reference space. For instance, if the target space defines the kinematics of a part of the robot arm in a joint space and the second reference space defines the kinematics of a part of the robot arm in a coordinate space, then the second space to target space transformation module 440 can be configured to forward kinematics as known from the field of robotics to transform the shaped second space target motion $X_t^*$ into a shaped second space target motion in the target space $M_{t1}$.

It is to be understood that the second space to target space transformation module 440 may be omitted in embodiments where the target motion $M_t$ indicates the target motion of the robot arm in the second reference space. Also, in embodiments where the target motion $M_t$ indicates the target motion of the robot arm in the first reference space then the second space to target space transformation module 440 can be configure to transform the shaped second space target motion $X_t^*$ into the first reference space.

Transforming the shaped first space target motion and the shaped second space target motion into the same reference space makes it possible to combine the two signals in an addition module 443 configured to add the two signals together.

In the illustrated embodiment a first space scaling module 441 is configured to scale the shaped first space target motion according to a first space scaling parameter $K_1$. This can be achieved by multiplying the shaped first space target motion with the first space scaling parameter and the multiplication is performed in the target space. Similarly, a second space scaling module 442 is configured to scale the shaped second space target motion according to a second space scaling parameter $K_2$. This can be achieved by multiplying the shaped first space target motion with the second space scaling parameter and the multiplication is performed in the target space.

Scaling the first space target motion and the second space target motion makes it possible to adjust the effect of the input shaping performed in the first space and in the second space in relation to each other. Which for instance can be in connection with robot arm movement where the robot arm in one part of the movement is controlled in joint space and in another part of the movement is controlled in a coordinate space. A gradually scaling of the shaped first space target motion and the shaped second spaced target motion can then be in a part of the motion where the movements blend together.

Consequently, the combined shaped target motion $M_t^*$ provided to the motor controller will be a linear combination of the shaped first space target motion and the shaped second space target motion in the target space where:

$$M_t^* = K_1 M_{t1}^* + K_1 M_{t2}^* \qquad \text{eq. 1}$$

$$0 \leq K_1 \leq 1 \qquad \text{eq. 2}$$

$$0 \leq K_2 \leq 1 \qquad \text{eq. 3}$$

$$K_1 + K_2 = 1 \qquad \text{eq. 4}$$

will result in a position of the robot arm defined between the position indicated by the shaped first space target motion $M_{t1}^*$ and the position indicated by the shaped second space target motion $M_{t2}^*$. By varying $K_1$ and $K_2$ over time, it will be possible to move gradually from $M_{t1}^*$, towards $M_{t2}^*$ (or opposite), effectively fading between in which of the first reference space and the second reference space the input shaping shall be applied. The restriction provided by eq. 4 ensures that the combined shaped target motion is not scaled and thus the robot arm will end up at the positions as planned by the motion planner module.

Figure 8:
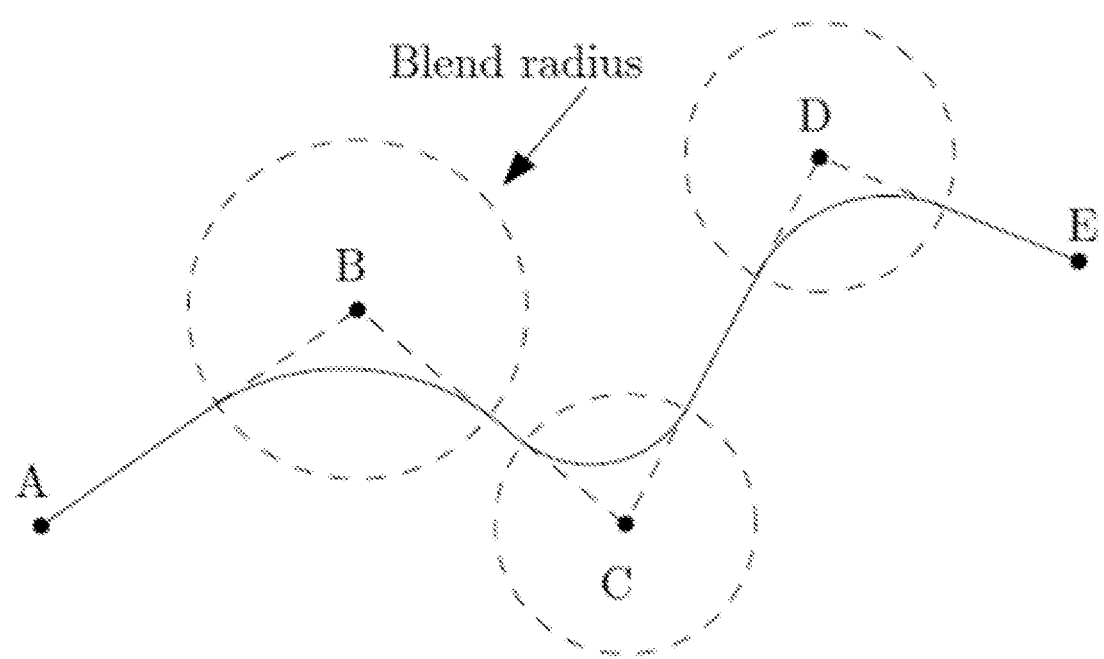
FIG. 8 illustrates the concept of blending between way points of a linear movement of a robot arm.

The ability to change from applying input shaping in a first reference space to applying input shaping in a second reference space without a need for standstill of the robot arm is beneficial. For example, robot arms can perform linear motions in joint space or Cartesian space, respectively. This invention makes it possible to make a soft transition from a joint space trajectory into the Cartesian trajectory, and vice-versa, i.e. without a standstill. In connection with robot arms provided by the applicant Universal Robots A/S, the feature is called blending in programming terms of Universal Robots. The concept of blending is illustrated in FIG. 8 with blending between linear trajectory segments.

However, the blend can be between any two types of motion, e.g. linear Cartesian, circular Cartesian, or linear joint space trajectory. When the end-effector distance to next waypoint becomes lower that a defined blend radius, the soft transition will start until the distance becomes larger than the blend radius. The present invention makes blending between to kinds of movements possible. For example, the input shaping could be moved from joint space to Cartesian space over 1/10 of a second by:

$$K_1 = \begin{cases} 0 & \text{for } t < 0s \\ \frac{1}{0,1}t & \text{for } t0s \leq t \leq 0, 1s \\ 1 & \text{for, } 1s < t \end{cases} \qquad \text{eq. 5}$$

$$K_2 = 1 - K_1 \qquad \text{eq. 6}$$

where t is time, starting from the initialization of the transition.

It is noted the linear interpolation suggested by the transition function of eq. 5 and eq. 6 is only intended as an illustrating example and that other kind of transition functions may be provided. For instance, a S-shaped transition function may be provided in order to reduce position derivatives, i.e. velocity and acceleration.

The first space to target space transformation module 439, the second space to target space transformation module 440, the first space scaling module 440 and the second space scaling module 442 is illustrated as a part of the combining module 438, however it is to be understood that they can be provided as separate modules.

Figure 5:
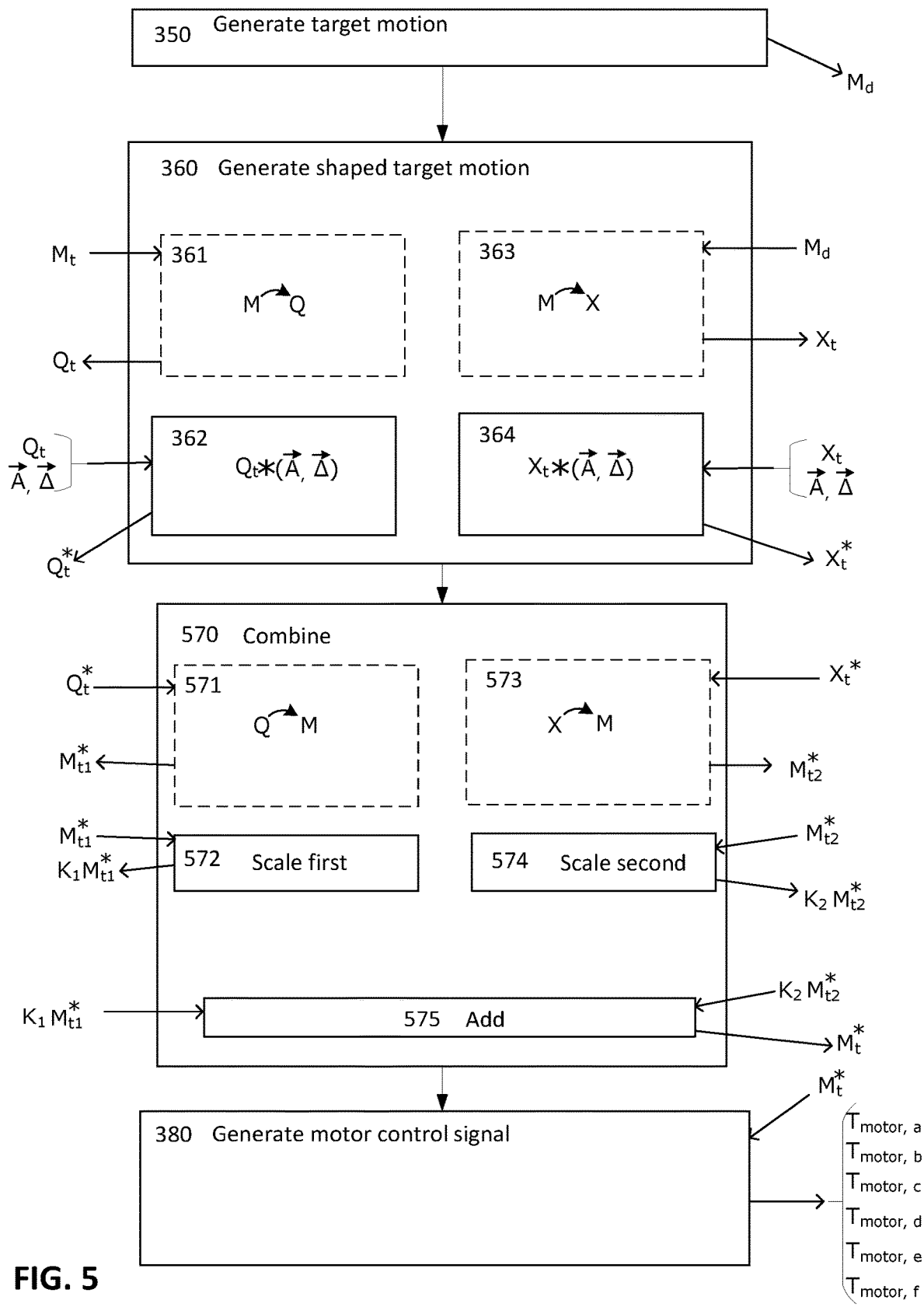
FIG. 5 illustrates a flow chart of an embodiment of a method of controlling a robot arm according to the present invention.

FIG. 5 illustrates a method of controlling a robot arm according to the present invention. The method is similar to the method illustrated in FIG. 3 and similar steps and parameters have been given the same reference numbers and will not be describe further.

In this embodiment the method comprises at least one of the steps of:
- transforming 571 the shaped first space target motion $Q_t^*$ into a shaped target motion $M_{t1}$ in at least one of a target reference space of the target motion and the second reference space;
- transforming 573 the shaped second space target motion $X_t^*$ into a shaped target motion $M_{t2}$ in at least one of a target reference space of the target motion and the first reference space.

The steps of transforming the shaped first space target motion $Q_t^*$ and the shaped second space target motion $X_t^*$ can be performed as described in connection with the first space to target space transformation module 439 and the second space to target space transformation module 440 in paragraphs [0048]-[0052].

Further the method comprises at least one of the steps:
- scaling 572 the shaped first space target motion according to a first space scaling parameter $K_1$;
- scaling 574 the shaped second space target motion according to a second space scaling parameter $K_2$.

The step 572 of scaling the shaped first space target motion and step 574 scaling the shaped second space target motion can be performed as described in connection with the a first space scaling module 441 and the second space scaling module 442 in paragraphs [0053]-[0054].

The method comprises a step 575 of combining the scaled shaped first space target motion $M_{t1}^*$ and the scaled shaped second space target motion $M_{t2}^*$ into the combined shaped target motion $M_t^*$. As described in paragraph [0055] the combined shaped target motion $M_t^*$ can be provide as a linear combination of the shaped first space target motion and the shaped second space target motion as defined by eq. 1-eq. 4.

The method illustrated in FIG. 5 provides the same advantages as the robot controller illustrated in FIG. 4 and described in paragraphs [0047]-[0059].

It is noted that the steps 571, 572, 573, and 574 is illustrates as a part of step 570 of combining the shaped first space target motion and the shaped second space target motion, however it is to be understood that they can be provided as separate method steps.

Figure 6:
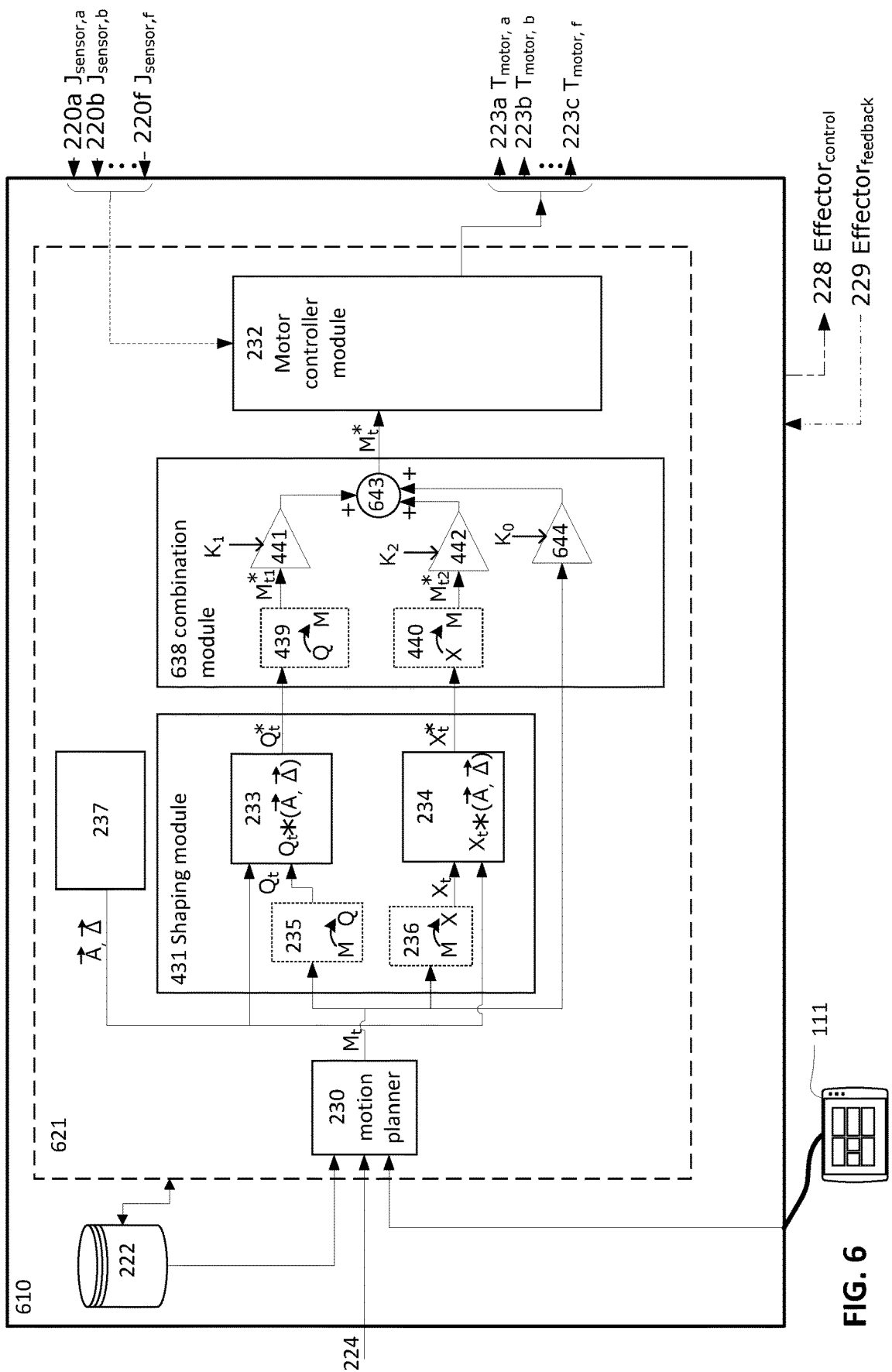
FIG. 6 illustrates a simplified structural diagram of an embodiment of a robot controller for a robot arm configured according to the present invention.

FIG. 6 illustrates a simplified structural diagram of a robot controller 610 for controlling a robot arm. The robot controller 610 is similar to the robot controller of the robot arm illustrated in FIGS. 1, 2 and 4 and similar elements and features have been given the same reference numbers and will not be describe further. Further the robot joints and end effector illustrated in FIGS. 1 and 2 have been omitted for simplicity of the drawing.

The robot controller 610 comprises a target motion scaling module 644 configured to scale the target motion $M_t$ according to a target motion scaling parameter $K_0$. This can be achieved by multiplying the target motion with the target motion scaling parameter and the multiplication is performed in the target space.

The robot controller comprises an addition module 643 configured to provide the combined shaped target motion $M_t^*$ by adding the scaled shaped first space target motion $K_1 M_{t1}^*$, the scaled shaped second space target motion $K_2 M_{t2}^*$ and the scaled target motion $K_0 M_t$ together in the same reference space.

This is beneficial in connection with robot arms which can alternate between different types of motion, for example linear joint motion, linear Cartesian motion, servo mode motion, and force mode motion. Different motion strategies require different control strategies and vibration suppression strategies. In some applications or motion strategies, it might be advantageous to disable vibration suppression. This would be applications, were fast response is important, and vibrations are unimportant.

Normally, a robot standstill is required, in order to enable or disable input shaping filters. Otherwise, discontinuities will appear in the target position reference, which would lead to error or larger vibrations. However, the functionality of the robot controller 410 can be extended as illustrated by the robot controller 610 of FIG. 6 such that the linear combination also includes a component of the unshaped target motion:

$$M_t^* = K_0 M_t + K_1 M_{t1}^* + K_1 M_{t2}^* \qquad \text{eq. 7}$$

$$0 \le K_0 \le 1 \qquad \text{eq. 8}$$

$$0 \le K_1 \le 1 \qquad \text{eq. 9}$$

$$0 \le K_2 \le 1 \qquad \text{eq. 10}$$

$$K_0 + K_1 + K_2 = 1 \qquad \text{eq. 11}$$

Thereby, input shaping can be enabled or disabled gradually over time without discontinuities in reference positions e.g. joint angles. As described in connection with FIG. 4 different transition functions could be employed for instance:

$$K_0 = 1 - K_1 \qquad \text{eq. 12}$$

$$K_1 = \begin{cases} 0 & \text{for } t < 0s \\ \dfrac{1}{0,1} t & \text{for } t0s \le t \le 0,1s \\ 1 & \text{for, } 1s < t \end{cases} \qquad \text{eq. 13}$$

$$K_2 = 0 \qquad \text{eq. 14}$$

which introduces a gradually blending of an unshaped target motion to a shaped first space target motion.

Figure 7:
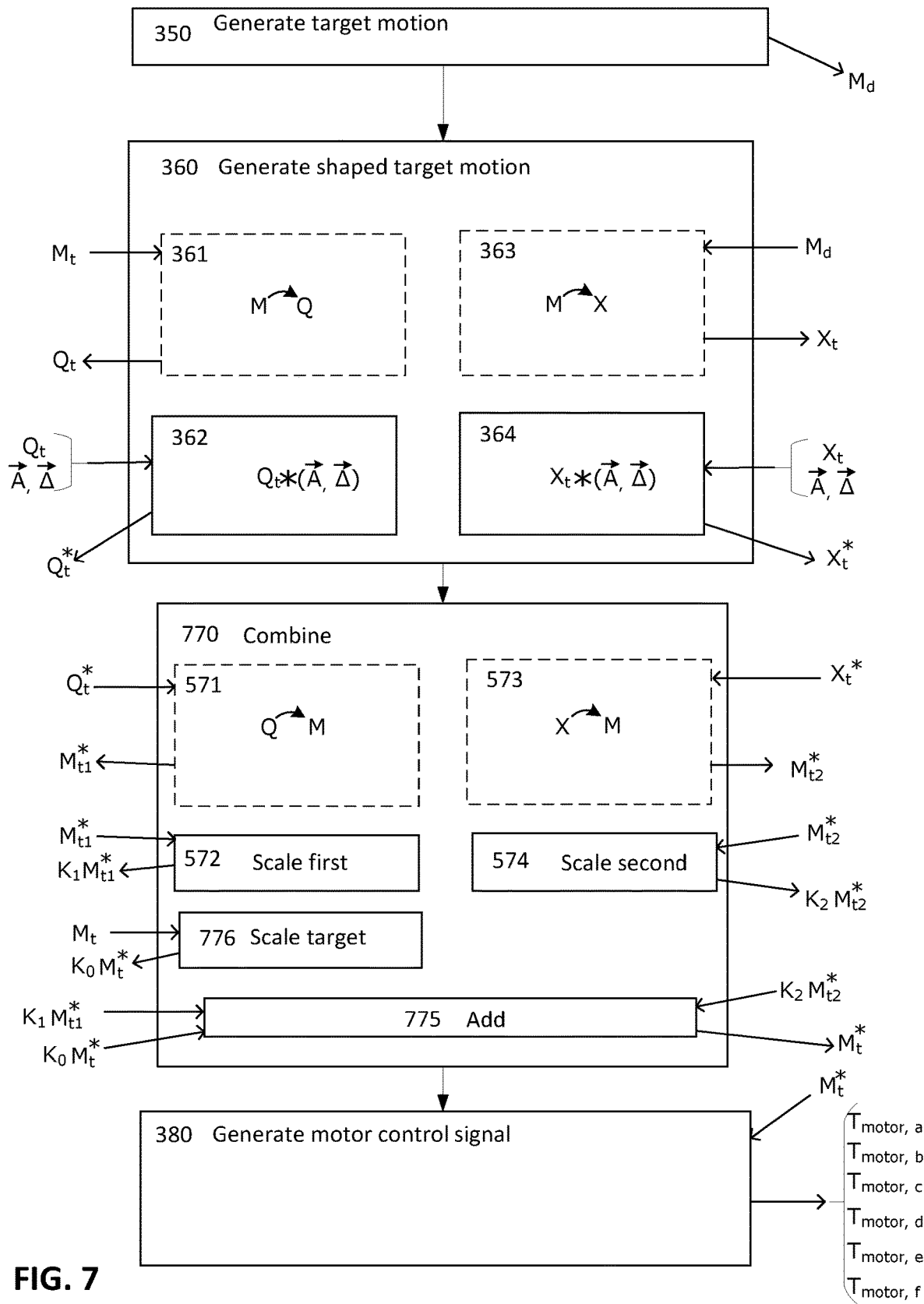
FIG. 7 illustrates a flow chart of an embodiment of a method of controlling a robot arm according to the present invention.

FIG. 7 illustrates a method of controlling a robot arm according to the present invention. The method is similar to the methods illustrated in FIGS. 3 and 5 and similar steps and parameters have been given the same reference numbers and will not be describe further.

The method comprises a step of scaling 776 the target motion $M_t$ according to a target space scaling parameter $K_0$, this can be performed as described in connection with target motion scaling module 644 in paragraph [0067]. The method illustrated in FIG. 7 provides the same advantages as the robot controller illustrated in FIG. 5 and described in paragraphs [0066]-[0070].

FIG. 8 illustrate a target motion where a part of the robot arm for instance the robot tool flange is starting from waypoint A, moves to waypoint B, moves to waypoint C, moves to waypoint D and moves to waypoint E and stops at waypoint E. The straight dotted lines indicate the trajectory if the robot tool flange is instructed to move in linear segments only. However, in some embodiment's waypoint B, C and D may be considered as guide points which the part of the robot arm not necessarily need to pass 100% accurate. These points can be given a blend radius indicated by dotted circles and the robot arm can be configured to perform a rotary motion in joint space when the part of the robot is inside the blend space. The solid line indicates the trajectory when blending is utilized. Blending results in a faster movement from waypoint A to waypoint E as moving in joint space it faster than moving in cartesian space, as the part of the robot does not need to stop in waypoint B, C and when blending.

FIG. 9 illustrates a simplified structural diagram of a robot controller 910 for controlling a robot arm. The robot controller 910 is similar to the robot controller of the robot arm illustrated in FIGS. 1 and 2 and similar elements and features have been given the same reference numbers and will not be describe further. In this embodiment the motor controller module 932 is configured to:

Generate at least a first motor control signal based on the shaped first space target motion $Q_t^*$ and a first dynamic model of the robot arm, where the first dynamic model is defined in the first reference space; for instance the motor controller module 932 comprises a first space motor control module 945 configured to generate the first motor control signal $T_{motor,Q}$ based on the shaped first space target motion $Q_t^*$ and a first dynamic model of the robot arm, where the first dynamic model is defined in the first reference space. The first motor control signal $T_{motor,Q}$ is a vector indicating motor control signals for the joint motors.

Generate at least a second motor control signal based on the shaped second space target motion $X_t^*$ and a second dynamic model of the robot arm, where the second dynamic model is defined in the second reference space; for instance the motor controller module 932 comprises a second space motor control module 946 configured to generate the second motor control signal $T_{motor,X}$ based on the shaped second space target motion $X_t^*$ and a second dynamic model of the robot arm, where the second dynamic model is defined in the second reference space, where the second motor control signal $T_{motor,X}$ is a vector indicating motor control signals for the joint motors.

Combine the at least first motor control signal and the at least second motor control signal into at least one combined motor control signal, where the at least one combined motor control signal is used for control of the robot joints, for instance the motor controller module 932 comprises a motor control signal combining module 947 configured to combine the at least first motor control signal and the at least second motor control signal into the control signals 223a, 223b, 223f indicating control parameters for the joint motors.

Figure 10:
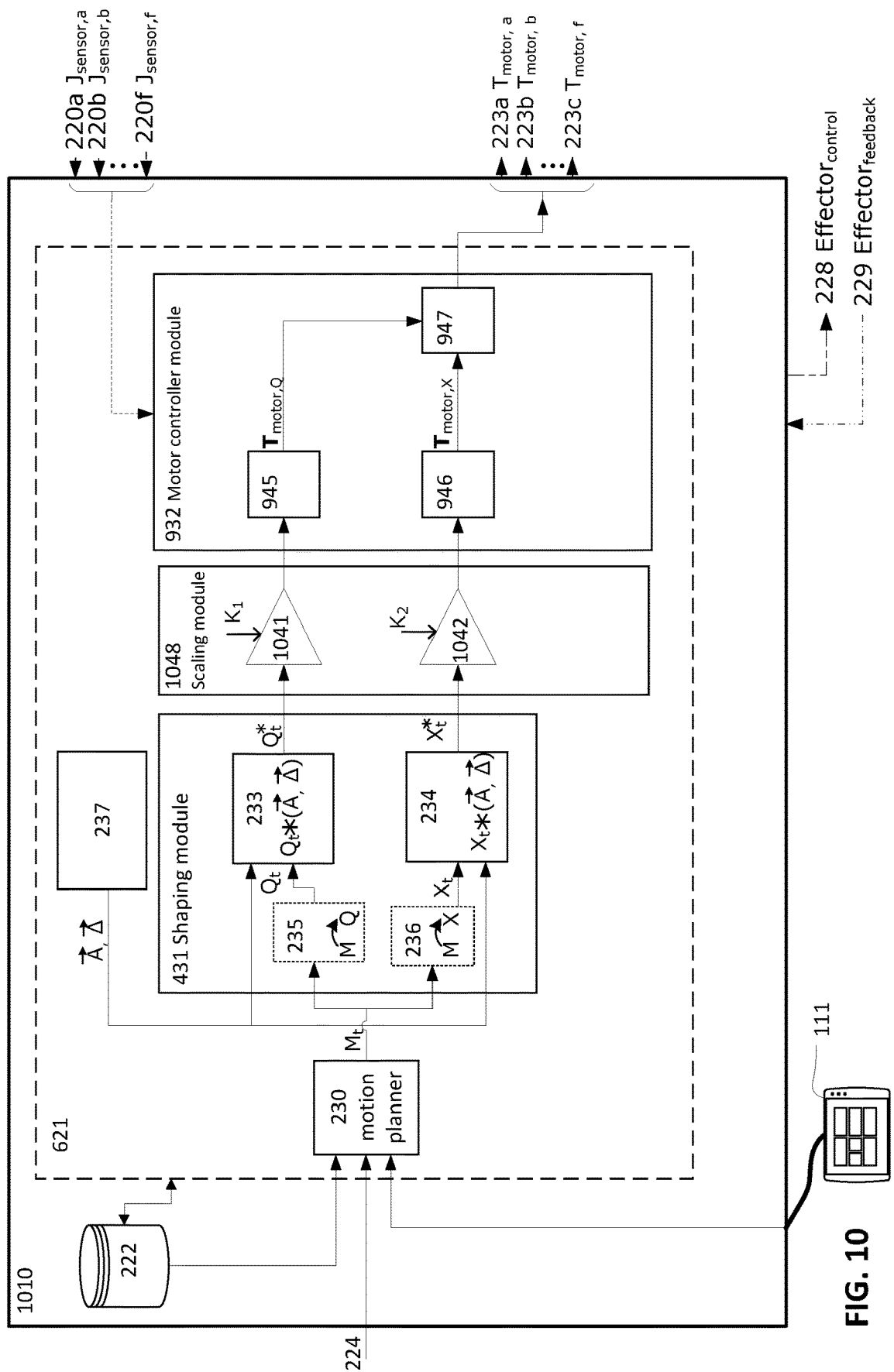
FIG. 10 illustrates a simplified structural diagram of an embodiment of a robot controller for a robot arm configured according to the present invention.

FIG. 10 illustrates a simplified structural diagram of a robot controller 1010 for controlling a robot arm. The robot controller 1010 is similar to the robot controller of the robot arms illustrated in FIGS. 1, 2 and 9 and similar elements and features have been given the same reference numbers and will not be describe further. Further the robot joints and end effector illustrated in FIG. 9 have been omitted for simplicity of the drawing. The robot controller comprises at least one scaling module 1048 configured to scale at least one of the shaped first space target motion according to a first space scaling parameter and the shaped second space target motion according to a second space scaling parameter.

In the illustrated embodiment a first space scaling module 1041 is configured to scale the shaped first space target motion $Q_t^*$ according to a first space scaling parameter $K_1$. This can be achieved by multiplying the shaped first space target motion with the first space scaling parameter. The scaled first space target motion $K_1 Q_t^*$ is then provided to the first space motor control module 945, which is configured to generate the first motor control signal $T_{motor,Q}$ based on the scaled shaped first space target motion $K_1 Q_t^*$ and a first dynamic model of the robot arm, where the first dynamic model is defined in the first reference space.

Similarly, a second space scaling module 1042 is configured to scale the shaped second space target motion according to a second space scaling parameter $K_2$. This can be achieved by multiplying the shaped second space target motion $X_t^*$ with the second space scaling parameter $K_2$. The scaled second space target motion $K_2 X_t^*$ is then provided to the second space motor control module 946, which is configured to generate the second motor control signal $T_{motor,X}$ based on the scaled shaped second space target motion $K_2 X_t^*$ and a second dynamic model of the robot arm, where the second dynamic model is defined in the second reference space.

The motor control signal $T_{motor,Q}$ and the second motor control signal $T_{motor,X}$ can then be combined into the control signals 223a, 223b, 223f indicating control parameters for the joint motors by the motor control signal combining module 947.

Scaling the first space target motion and the second space target motion makes it possible to adjust the effect of the input shaping performed in the first space and in the second space in relation to each other and blending between movements in different reference spaces can hereby be achieve. The blending can for instance be performed similar to the description in paragraphs [0054]-[0058], where the first and second scaling parameters fulfill eq. 2, eq. 3 and eq. 4 and as an example is varied according to eq. 5 and eq. 6.

Figure 11:
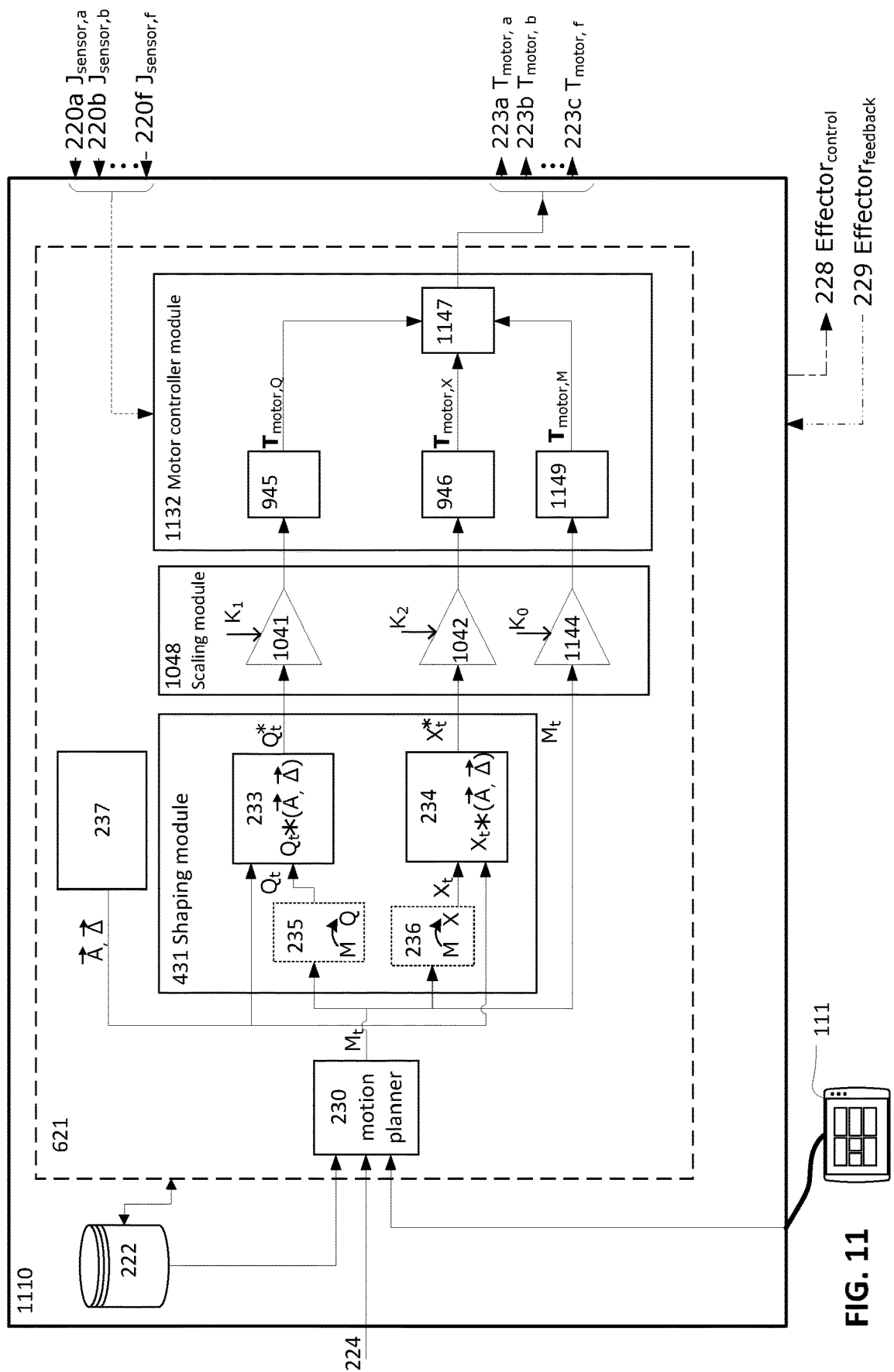
FIG. 11 illustrates a simplified structural diagram of an embodiment of a robot controller for a robot arm configured according to the present invention.

FIG. 11 illustrates a simplified structural diagram of a robot controller 1110 for controlling a robot arm. The robot controller 1010 is similar to the robot controller of the robot arm illustrated in FIG. 10 and similar elements and features have been given the same reference numbers and will not be describe further.

The robot controller 1110 comprises a target motion scaling module 1144 configured to scale the target motion $M_t$ according to a target motion scaling parameter $K_0$. This can be achieved by multiplying the target motion with the target motion scaling parameter and the multiplication is performed in the target space. Further the motor controller module 1132 is comprises a target space motor control module 1149 configured to a target motor control signal $T_{motor,M}$ based on the shaped target motion $M_t$ and a target dynamic model of the robot arm, where the target dynamic model is defined in the target reference space. The target motor control signal $T_{motor,M}$ is a vector indicating motor control signals for the joint motors.

The motor control signal $T_{motor,Q}$, the second motor control signal $T_{motor,X}$ and the target motor control signal $T_{motor,M}$ can then be combined into the control signals 223a, 223b, 223f indicating control parameters for the joint motors by the motor control signal combining module 1147.

This makes is possible to control the robot arm as a combination of the unshaped motion and shaped motions in different reference spaces, this provides similar advantages and can be performed similar to the description in paragraphs [0069]-[0070], where the target, first and second scaling parameters fulfill eq. 8, eq. 9, eq. 10 and eq. 11 and as an example is varied according to eq. 12, eq. 13 and eq. 14.

Summarizing the present invention makes it possible to reduces the Cartesian path deviation caused by joint space input shaping and discloses a method to implement Cartesian input shaping to handle the limitations of joint space shaping. The presented invention allows to robot programmer to change the filtering space during motion, without additional delay.

The modules of the robot controller can for instance be configured to carry out the described functions and tasks by programming these as steps in a software program executed by a processer. Likewise the method according to the present invention can be implemented as method steps carried out by processors of a robot controller.

BRIEF DESCRIPTION OF FIGURE REFERENCES

| | |
|---|---|
| 100 | robot system |
| 101 | robot arm |
| 102a-102f | robot joint |
| 103 | robot base |
| 104 | robot tool flange |
| 105a-105f | robot joints axis |
| 106a-106f | rotation arrow of robot joints |
| 107 | robot tool flange reference point |
| 108 | base reference point |
| 109 | direction of gravity |
| 110, 410, 610, 910, 1010, 1110 | robot controller |
| 111 | interface device |
| 112 | display |
| 113 | input devices |
| 216a; 216b; 216f | output flange |
| 217a; 217b; 217f | joint motors |
| 218a; 218B, 218f | output axle |
| 219a; 219b; 219f | joint sensor |
| 220a, 220b, 220f | joint sensor signal |
| 221, 421, 621 | processor |
| 222 | memory |
| 223a, 223b, 223f | motor control signals |
| 224 | external control signal |
| 126 | end effector |
| 228 | end effector control signal |
| 229 | effector feedback signal |
| 230 | motion planning module |
| 231 | shaping module |
| 232; 932; 1132 | motor controller module |
| 233 | first space shaping module |
| 234 | second space shaping module |
| 235 | target space to first space transformation module |
| 236 | target space to second space transformation module |
| 237 | impulse generator |
| 238; 438; 638 | shaped target motion combining module |
| 439 | first space to target space transformation module |
| 440 | second space to target space transformation module |
| 441; 1041 | first space scaling module |
| 442; 1042 | second space scaling module |
| 443; 643 | addition module |
| 644 | target space scaling module |
| 945 | first space motor control module |
| 946 | second space motor control module |
| 947; 1147 | motor control signals combining module |
| 1048 | scaling module |
| 1149 | target space motor control module |
| 350 | generate target motion |
| 360 | generate shaped target motions |
| 361 | transform target motion into first space target motion |
| 362 | generate shaped first space target motion |
| 363 | transform target motion into second space target motion |
| 364 | generate shaped second space target motion |
| 370, 570, 770 | combine shaped target motions |
| 571 | transform shaped first space target motion into target space |
| 572 | scale shaped first space target motion |
| 573 | transform shaped second space target motion into target space |
| 574 | scale shaped second space target motion |
| 575, 775 | combine shaped target motions |
| 776 | scale target motion |
| 380 | generate control signal for robot arm |

The invention claimed is:

1. A robot controller for controlling a robotic arm, where the robotic arm comprises joints connecting a base of the robotic arm and a tool flange, and where at least one of the joints comprises an output flange that is movable relative to a body of a joint, the robotic arm comprising a motor configured to move the output flange relative to the body, the robot controller comprising:
a shaping module configured to shape a target motion of the robotic arm; and
a motor controller module configured to generate at least one motor control signal for the motor;
wherein the shaping module comprises:
a first space shaping module configured to produce a shaped first space target motion by convolving a first space target motion with an impulse train, where the first space target motion defines the target motion in a first reference space; and
a second space shaping module configured to produce a shaped second space target motion by convolving a second space target motion with an impulse train, where the second space target motion defines the target motion in a second reference space; and
wherein the motor controller module is configured to generate the at least one motor control signal based on both the shaped first space target motion and the shaped second space target motion.

2. The robot controller of claim 1, wherein the target motion comprises a continuous motion of at least a part of the robotic arm.

3. The robot controller of claim 1, wherein the target motion comprises a continuous motion of at least a part of the robotic arm; and
wherein the robot controller is configured to perform operations comprising:
for a first part of the target motion, generating the at least one motor control signal based on the shaped first space target motion and not based on the shaped second space target motion; and
for a second part of the target motion, generating the at least one motor control signal based on the shaped second space target motion and not based on the shaped first space target motion.

4. The robot controller of claim 1, further comprising:
a combining module configured to combine the shaped first space target motion and the shaped second space target motion into a combined shaped target motion;
wherein the motor controller module is configured to generate the at least one motor control signal based on the combined shaped target motion.

5. The robot controller of claim 1, wherein the motor controller module comprises:
a first space motor control module configured to generate a first motor control signal based on the shaped first space target motion and a first dynamic model of the robotic arm, where the first dynamic model is defined in the first reference space;
a second space motor control module configured to generate a second motor control signal based on the shaped second space target motion and a second dynamic model of the robotic arm, where the second dynamic model is defined in the second reference space; and
a motor control signal combining module configured to generate the at least one motor control signal based on the first motor control signal and the second motor control signal.

6. The robot controller of claim 1, wherein the first reference space and the second reference space are different.

7. The robot controller of claim 1, wherein the first reference space is a joint reference space in which kinematics of at least a part of the robotic arm are based on joint parameters, where the joint parameters are based on kinematics of at least one joint motor and at least one output flange.

8. The robot controller of claim 1, wherein the second reference space is a coordinate space in which kinematics of at least a part of the robotic arm are defined relative to te a reference point.

9. The robot controller of claim 1, further comprising:
at least one space transformation module configured to transform the target motion into at least one of the first space target motion in the first reference space or the second space target motion in the second reference space.

10. The robot controller of claim 1, further comprising:
at least one space transformation module configured to transform at least one of:
    the shaped first space target motion into a shaped first target motion in at least one of a target reference space of the target motion or the second reference space; and
    the shaped second space target motion into a shaped second target motion in at least one of a target reference space of the target motion or the first reference space.

11. The robot controller of claim 1, further comprising:
at least one scaling module configured to scale at least one of:
    the shaped first space target motion according to a first space scaling parameter to produce a scaled shaped first space target motion; or and
    the shaped second space target motion according to a second space scaling parameter to produce a scaled shaped second space target motion.

12. The robot controller of claim 11, further comprising:
a shaped target motion combining module configured to combine the scaled shaped first space target motion and the scaled shaped second space target motion into a combined shaped target motion on which the at least one motor control signal is based.

13. The robot controller of claim 1, further comprising:
at least one target motion scaling module configured to scale the target motion prior to convolving based on a target motion scaling parameter.

14. A method of controlling a robotic arm, where the robotic arm comprises joints connecting a base of the robotic arm and a tool flange, and where at least one of the joints comprises an output flange that is movable relative to a body of a joint, the robotic arm comprising a motor configured to move the output flange relative to the body, the method comprising:
    generating a target motion of the robotic arm;
    generating a shaped first space target motion by convolving a first space target motion with an impulse train, where the first space target motion defines the target motion of the robotic arm in a first reference space;
    generating a shaped second space target motion by convolving a second space target motion with an impulse train, where the second space target motion defines the target motion of the robotic arm in a second reference space; and
    generating at least one motor control signal for at least one joint motor of the robotic arm based on both the shaped first space target motion and the shaped second space target motion.

15. The method of claim 14, wherein the target motion comprises a continuous motion of at least a part of the robotic arm.

16. The method of claim 14, wherein the target motion comprises a continuous motion of at least a part of the robotic arm; and
wherein the method comprises:
    for a first part of the target motion, generating the at least one motor control signal based on the shaped first space target motion and not based on the shaped second space target motion; and
    for a second part of the target motion, generating the at least one motor control signal based on the shaped second space target motion and not based on the shaped first space target motion.

17. The method of claim 14, further comprising:
combining the shaped first space target motion and the shaped second space target motion into a combined shaped target motion, where generating the at least one motor control signal is based on the combined shaped target motion of both the shaped first space target motion and the shaped second space target motion.

18. The method of claim 14, further comprising:
generating a first motor control signal based on the shaped first space target motion and a first dynamic model of the robotic arm, where the first dynamic model is defined in the first reference space;
generating a second motor control signal based on the shaped second space target motion and a second dynamic model of the robotic arm, where the second dynamic model is defined in the second reference space; and
combining the first motor control signal and the second motor control signal to generate the at least one motor control signal.

19. The method of claim 14, wherein the first reference space and the second reference space are different.

20. The method of claim 14, wherein the first reference space is a joint reference space in which kinematics of at least a part of the robotic arm are based on robot joint parameters, where the robot joint parameters correspond to kinematics of at least one joint motor and kinematics of at least one output flange.

21. The method of claim 14, wherein the second reference space is a coordinate space in which kinematics of at least a part of the robotic arm are relative to a reference point.

22. The method of claim 14, further comprising:
transforming the target motion into the first space target motion in the first reference space; and
transforming the target motion into the second space target motion in the second reference space.

23. The method of claim 14, further comprising:
transforming the shaped first space target motion into a shaped target motion in at least one of a target reference space of the target motion or the second reference space; and
transforming the shaped second space target motion into a shaped target motion in at least one of a target reference space of the target motion or the first reference space.

24. The method of claim 14, further comprising:
scaling the shaped first space target motion based on a first space scaling parameter to produce a scaled shaped first space target motion; or scaling the shaped second space target motion based on a second space scaling parameter to produce a scaled shaped second space target motion.

25. The method of claim 24, further comprising:
combining the scaled shaped first space target motion and the scaled shaped second space target motion to produce a combined shaped target motion.

26. The method of claim 14, further comprising:
scaling the target motion prior to convolving.

* * * * *